United States Patent
Marolia et al.

(10) Patent No.: US 12,335,142 B2
(45) Date of Patent: Jun. 17, 2025

(54) NETWORK INTERFACE FOR DATA TRANSPORT IN HETEROGENEOUS COMPUTING ENVIRONMENTS

(71) Applicant: Intel Corporation, Santa Clara, CA (US)

(72) Inventors: Pratik M. Marolia, Hillsboro, OR (US); Rajesh M. Sankaran, Portland, OR (US); Ashok Raj, Portland, OR (US); Nrupal Jani, Hillsboro, OR (US); Parthasarathy Sarangam, Portland, OR (US); Robert O. Sharp, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/417,570

(22) Filed: Jan. 19, 2024

(65) Prior Publication Data
US 2024/0314072 A1    Sep. 19, 2024

Related U.S. Application Data

(60) Continuation of application No. 17/129,756, filed on Dec. 21, 2020, now Pat. No. 11,929,927, which is a
(Continued)

(51) Int. Cl.
*H04L 45/60* (2022.01)
*G06F 12/1081* (2016.01)
(Continued)

(52) U.S. Cl.
CPC ........ *H04L 45/742* (2013.01); *G06F 12/1081* (2013.01); *G06F 13/28* (2013.01); *H04L 45/60* (2013.01); *H04L 49/9068* (2013.01)

(58) Field of Classification Search
CPC ............... G06F 12/1081; G06F 13/385; G06F 2212/1024; H04L 49/9068; H04L 45/60
See application file for complete search history.

(56) References Cited

U.S. PATENT DOCUMENTS

| 7,945,721 B1 | 5/2011 | Johnsen et al. |
| 8,914,556 B2 | 12/2014 | Magro et al. |
(Continued)

FOREIGN PATENT DOCUMENTS

| EP | 2722767 A1 | 4/2014 |
| JP | 2014509106 A | 4/2014 |
(Continued)

OTHER PUBLICATIONS

Indian Examination Report for Indian Patent Application No. 202147041932, Mailed Apr. 4, 2024, 8 pages.
(Continued)

*Primary Examiner* — Syed Ali
(74) *Attorney, Agent, or Firm* — Essential Patents Group, LLP; Christopher K. Gagne

(57) ABSTRACT

A network interface controller can be programmed to direct write received data to a memory buffer via either a host-to-device fabric or an accelerator fabric. For packets received that are to be written to a memory buffer associated with an accelerator device, the network interface controller can determine an address translation of a destination memory address of the received packet and determine whether to use a secondary head. If a translated address is available and a secondary head is to be used, a direct memory access (DMA) engine is used to copy a portion of the received packet via the accelerator fabric to a destination memory buffer associated with the address translation. Accordingly, copying a portion of the received packet through the host-to-device fabric and to a destination memory can be avoided
(Continued)

and utilization of the host-to-device fabric can be reduced for accelerator bound traffic.

33 Claims, 14 Drawing Sheets

Related U.S. Application Data division of application No. 16/435,328, filed on Jun. 7, 2019, now Pat. No. 11,025,544.

(51) Int. Cl.
*G06F 13/28* (2006.01)
*H04L 45/74* (2022.01)
*H04L 49/90* (2022.01)

(56) References Cited

U.S. PATENT DOCUMENTS

| | | | |
|---|---|---|---|
| 10,459,847 | B1 | 10/2019 | Shah et al. |
| 10,509,764 | B1* | 12/2019 | Izenberg ............... G06F 16/22 |
| 10,523,675 | B2* | 12/2019 | Bhabbur ............... H04L 9/0643 |
| 10,579,591 | B1 | 3/2020 | Diamant et al. |
| 10,880,204 | B1* | 12/2020 | Shalev ................. H04L 47/365 |
| 11,444,886 | B1* | 9/2022 | Stawitzky ............. H04L 47/34 |
| 2002/0032876 | A1 | 3/2002 | Okagaki et al. |
| 2002/0144001 | A1 | 10/2002 | Collins et al. |
| 2006/0034310 | A1 | 2/2006 | Connor |
| 2006/0149919 | A1 | 7/2006 | Arizpe et al. |
| 2007/0143395 | A1 | 6/2007 | Uehara et al. |
| 2007/0162641 | A1 | 7/2007 | Oztaskin et al. |
| 2009/0138645 | A1 | 5/2009 | Chun et al. |
| 2011/0179199 | A1 | 7/2011 | Chen et al. |
| 2012/0287944 | A1* | 11/2012 | Pandit ................... H04L 69/22 709/212 |
| 2013/0138758 | A1 | 5/2013 | Cohen et al. |
| 2015/0163014 | A1 | 6/2015 | Birrittella |
| 2015/0180782 | A1 | 6/2015 | Rimmer et al. |
| 2015/0189047 | A1* | 7/2015 | Naaman ............... G06F 16/134 370/474 |
| 2015/0324306 | A1 | 11/2015 | Chudgar et al. |
| 2016/0077976 | A1 | 3/2016 | Raikin et al. |
| 2016/0154756 | A1 | 6/2016 | Dodson et al. |
| 2016/0188527 | A1* | 6/2016 | Cherian ................ H04L 41/12 709/212 |
| 2016/0342547 | A1 | 11/2016 | Liss et al. |
| 2017/0075857 | A1 | 3/2017 | Izenberg et al. |
| 2017/0249079 | A1 | 8/2017 | Mutha et al. |
| 2017/0371789 | A1 | 12/2017 | Blaner et al. |
| 2018/0285288 | A1 | 10/2018 | Bernat et al. |
| 2018/0329650 | A1* | 11/2018 | Guim Bernat ........ G06F 3/0619 |
| 2019/0043064 | A1* | 2/2019 | Chin ................... G06Q 30/0201 |
| 2019/0044738 | A1* | 2/2019 | Liu ......................... H04W 4/40 |
| 2019/0079895 | A1* | 3/2019 | Kim ....................... G06F 3/061 |
| 2019/0087218 | A1 | 3/2019 | Loftus et al. |
| 2019/0098432 | A1* | 3/2019 | Carlson ................. H04W 4/70 |
| 2019/0102311 | A1 | 4/2019 | Gupta et al. |
| 2019/0171612 | A1 | 6/2019 | Shahar et al. |
| 2019/0236022 | A1 | 8/2019 | Gopal et al. |
| 2019/0297015 | A1 | 9/2019 | Marolia et al. |
| 2019/0295343 | A1 | 10/2019 | Gopal |
| 2019/0332879 | A1 | 10/2019 | Rosenkrantz et al. |
| 2020/0233717 | A1 | 7/2020 | Smith et al. |
| 2020/0257545 | A1 | 8/2020 | Ogawa et al. |
| 2020/0293499 | A1 | 9/2020 | Kohli et al. |
| 2020/0387611 | A1* | 12/2020 | Yao ...................... G06F 21/572 |
| 2021/0078571 | A1* | 3/2021 | Zhu ....................... H04W 12/03 |
| 2021/0389741 | A1 | 12/2021 | Iwami |

FOREIGN PATENT DOCUMENTS

| | | |
|---|---|---|
| KR | 20180134745 A | 12/2018 |
| WO | 2018102416 A1 | 6/2018 |

OTHER PUBLICATIONS

Alam, Sadaf, Bianco Mauro, "Use Cases and Status of GPUDirect: A High Productivity & Performance Feature for GPU Supercomputing", Swiss National Supercomputing Centre (CSCS), 2012, 25 pages.

European First Office Action, (EP Exam Report Article 94(3) EPC), for Patent Application No. 20165324.3, Mailed Jun. 21, 2022, 5 pages.

European Second Office Action, (EP Exam Report Article 94(3) EPC), for Patent Application No. 20165324.3, Mailed Jan. 4, 2024, 4 pages.

Extended European Search Report for Patent Application No. 20165324.3, Mailed Sep. 18, 2020, 10 pages.

Final Office Action for U.S. Appl. No. 17/129,756, Mailed Mar. 17, 2023, 24 pages.

First Office Action for U.S. Appl. No. 16/435,328, Mailed Jul. 23, 2020, 29 pages.

First Office Action for U.S. Appl. No. 17/129,756, Mailed Oct. 12, 2022, 20 pages.

Humair's Blogs, "Separate Control Plane and Data Plane", 6WIND-From Data Plane Acceleration to Virtual Appliances, Humair Ahmed. com, retrieved from: http://humairahmed.com/blog/?tag=separate-control-plane-and-data-plane, Apr. 12, 2015, 6 pages.

International Search Report and Written Opinion for PCT Patent Application No. PCT/US20/23934, Mailed Jul. 9, 2020, 9 pages.

Microsoft Docs, "Scale up a Service Fabric cluster primary node type", retrieved from https://https://docs.microsoft.com/en-us/azure/service-fabric/service-fabric-scale-up-node-type, Feb. 12, 2019, 4 pages.

Notice of Allowance for U.S. Appl. No. 16/435,328, Mailed Feb. 1, 2021, 20 pages.

Notice of Allowance for U.S. Appl. No. 17/129,756, Mailed Oct. 17, 2023, 15 pages.

Recio, R. et al., "A Remote Direct Memory Access Protocol Specification", Network Working Group, RFC 5040, Standards Track, Oct. 2007, 66 pages.

Recio, Renato, "A Tutorial of the RDMA Model", retrieved from https://www.hpcwire.com/2006/09/15/a_tutorial_of_the_rdma_model-1/, Sep. 15, 2006, 20 pages.

Russell, Robert D., "Introduction to RDMA Programming", InterOperability Laboratory and Computer Science Department, University of New Hampshire, New Hampshire, USA, Iol, 2012, 76 pages.

SDN Tutorials, "Difference Between Control Plane and Data Plane", Software Defined Networking for Beginners, http://sdntutorials.com/difference-between-control-plane-and-data-plane/, Copyright 2019, 6 pages.

Techopedia, "Definition-What does Control Plane mean?", https://www.techopedia.com/definition/32317/control-plane, 2 pages.

Wiki-Github, "RDMA (Remote Direst Memory Access) Tutorial", retrieved from: https://github.com/jcxue/RDMA-Tutorial/wiki, Mar. 2017, 11 pages.

Wikipedia, "Control Plane", retrieved from: https://en.wikipedia.org/w/index.php?title=Control_plane&oldid=885661998, last edited on Mar. 1, 2019, 3 pages.

Notice of Allowance from European Patent Application No. 20165324.3 notified May 27, 2024, 8 pgs.

"CUDA Toolkit Archive", <https://developer.nvidia.com/cuda-toolkit-archive> NVIDIA Developer, 3 pgs.

"Does the NVIDIA RDMA GPUDirect always operate only physical addresses (in physical address space of the CPU) ?", <https://stackoverflow.com/questions/19841815/does-the-nvidia-rdma-gpudirect-always-operate-only-physical-addresses-in-physic> Nov. 7, 2013, 8 pgs.

"Mellanox Introduces ConnectX-3 10/40GbE Adapters with Multiple Physical Functions for VMware ESXi 5.0", Aug. 29, 2011 Press Release, 4 pgs.

"Mellanox OFED GPUDirect RDMA", 2018 Mellanox Technologies, Software Product Brief, 2 pgs.

"NVIDIA Mellanox Quantum Hdr 200G Infiniband Switch Silicon", Mellanox Technologies, Product Brief, Sep. 2020, 3 pgs.

(56) References Cited

OTHER PUBLICATIONS

"QM8700 Mellanox Quantum HDR Edge Switch", 2018 Mellanox Technologies, Switch system Product Brief, 2 pgs.
"RDMA Aware Networks Programming User Manual", Rev. 1.7, 2015 Mellanox Technologies, 216 pgs.
"Running ROCE over L2 Network Enabled with PFC", Mellanox Technologies, Rev. 2.0, May 2016, 3 pgs.
Daoud, Feras, et al., "Asynchronous Peer-to-Peer Device Communication", OpenFabrics Alliance Workshop, Mar. 28, 2017, 28 pgs.
Rossetti, Davide, "Benchmarking GPUDirect RDMA on Modern Server Platforms", NVIDIA Technical Blog, Oct. 7, 2014, 12 pgs.
Extended European Search Report from European Patent Application No. 24191588.3 notified Nov. 14, 2024, 14 pgs.

* cited by examiner

NETWORK INTERFACE FOR DATA TRANSPORT IN HETEROGENEOUS COMPUTING ENVIRONMENTS

RELATED APPLICATION

This application is a continuation of U.S. patent application Ser. No. 17/129,756, filed Dec. 21, 2020, which is a divisional of U.S. patent application Ser. No. 16/435,328, filed Jun. 7, 2019. The entire specifications of which are hereby incorporated herein by reference in their entirety.

TECHNICAL FIELD

Various examples described herein relate to routing packets to target memory devices in heterogeneous computing environments.

BACKGROUND

In the context of artificial intelligence (AI) and machine learning (ML), Deep Neural Networks (DNNs) are becoming increasingly popular for performing tasks such as object classification, object detection, speech recognition, and other inferences. DNNs find applications in both performance driven servers and power optimized edge devices. As the size of a model increases, the number of weights and activations increase as does the amount of computations. Accelerator devices dedicated to performing tasks related to computations for neural networks are common.

Deep Learning (DL) algorithms used for AI require memory, compute, and network scaling to complete the computations efficiently. These algorithms can be implemented as data parallel, model parallel or hybrid models. DL algorithm implementations require processing of large datasets distributed among many compute nodes and consolidation of results from nodes for the final results.

DETAILED DESCRIPTION

Figure 1:
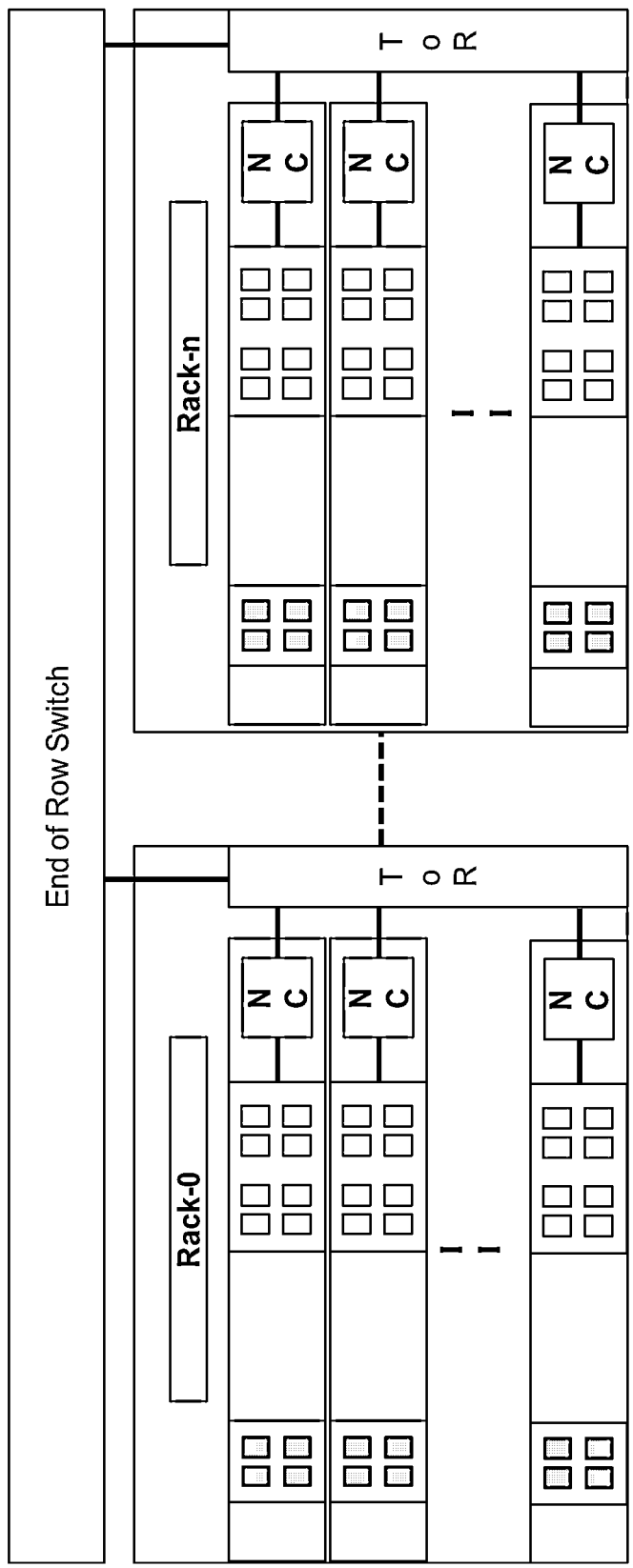
FIG. 1 shows an example of components used to run Deep Learning applications in a data center.

FIG. 1 shows an example of components used to run Deep Learning or other machine learning (ML) or other artificial intelligence (AI) applications in a data center. In order to distribute, compute, and synchronize large datasets among compute nodes, the following key components can be used in a data center running large DL applications. A compute node can be composed of multiple heterogeneous compute elements connected together using scale-up fabrics, CPU scale-up fabric, and an accelerator scale-up fabric. An optional, host-to-device fabric may connect host to the accelerator device. Compute nodes can be connected together using a network that includes Top of Rack (ToR) or End of Row (EoR).

For example, multiple kinds of compute engines can include CPUs, cores, accelerators, or graphics processing units (GPUs). In addition, or alternatively, compute nodes with high bandwidth memory (HBM) can be used to process the large datasets. High-bandwidth and low latency scale-up fabrics are used to provide connection of compute elements within a node and across the nodes. A host fabric can be used to connect processors (e.g., cores or central processing units (CPUs)) to one another (e.g., Intel Ultra Path Interconnect (UPI) or QuickPath Interconnect (QPI)). An I/O fabric can be used to connect a network interface with a compute node (e.g., peripheral component interconnect express (PCIe)). An accelerator fabric can be used to connect GPUs or accelerators together (e.g., Nvidia NVLink, PCIe switching, CCIX, GenZ, Compute Express Link (CXL)). These fabrics can connect with Top of Rack (ToR) or End of Row (EoR) switches.

However, current network controllers are single headed and can be connected to only one host fabric. This limitation requires data targeted for accelerators to pass through multiple fabrics and incurs additional data copies resulting in increased latency and higher memory bandwidth usage. For example, for data received at a network controller or fabric interface to be provided to a target accelerator, the data is provided by the network controller to the host fabric, stored in a memory associated with a processor that is connected to the host fabric, and then the data is copied via an accelerator fabric to a memory device or domain associated with the target accelerator. Two copies are used in this example: one to processor memory and second to accelerator memory.

Another known solution involves data received by a network interface being directly written to the accelerator memory (with no intermediate copy to host memory). But the path of data traverses through multiple fabrics, first through a host-to-device fabric to CPU memory, potentially through CPU scale-up fabric across CPU sockets, then through host-to-device fabric to accelerator memory. In addition, this solution requires custom software stack enabling.

Various embodiments provide network controller enhancements to connect a high-bandwidth and low latency accelerator scale-up fabric within a compute node in a large data center. Elements connected to a scale-up fabric can be located in same server chassis, share use of an operating system, or share same host central processing unit (CPU). Various embodiments provide a multi-headed network controller for low latency and non-uniform memory access (NUMA) optimized remote direct memory access (RDMA) input/output operations on a platform with the heterogeneous compute element running various accelerator applications. A network controller can have primary and secondary heads where a primary head is connected to a host-to-device fabric and a secondary head is connected to an accelerator scale-up fabric to provide a NUMA input/output solution. A multi-headed network controller is configured to determine whether a received packet is to be direct copied using an accelerator scale-up fabric to a memory attached to an accelerator where CPU memory and accelerator memory are accessible by all compute elements. The accelerator memory may be either accessible by CPU as regular write-back memory or exposed to the CPU as an MMIO aperture. The network controller can determine if a translated address of a destination memory address (e.g., untranslated address) is available at the network interface via a cache or through an address translation service. If the translated address is available, then the translated address is decoded to determine a route to a destination memory that is to receive a portion of the received packet. If the route is through an accelerator fabric, a secondary head can be used whereby a direct memory access (DMA) operation is invoked to copy the portion of the received packet through accelerator fabric to the destination memory. If the route is not specified as using the accelerator fabric, a host fabric is used to copy the portion of the received packet to the destination accelerator memory.

Figure 2A:
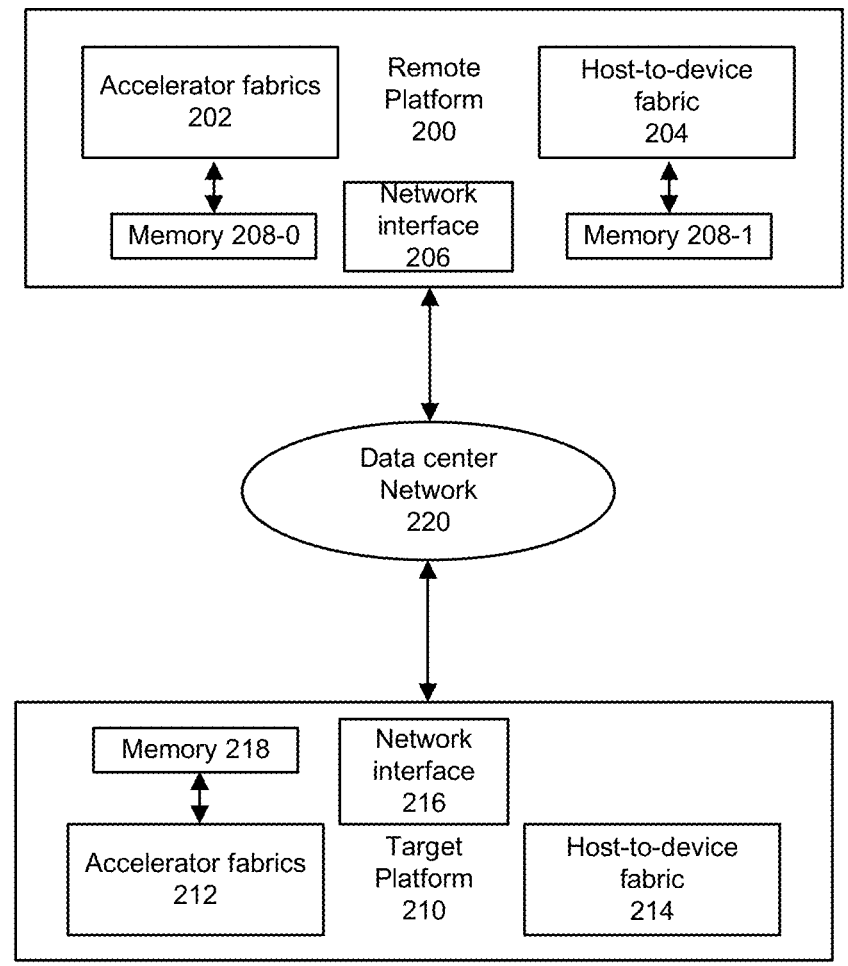
FIG. 2A depicts a high level system diagram in which a network interface provides received packets directly to an accelerator fabric for transfer to a memory device.

FIG. 2A depicts a high level system diagram in which a network interface provides received packets directly to an accelerator fabric for transfer to a destination memory accessible to an accelerator device. For example, target platform 210 can include or use a network interface 216 that receives packets from remote platform 200 via data center network 220. If authorized, network interface 216 copies content (e.g., from memory 208-0 or memory 208-1) or packets directly to memory 218 via a secondary head through accelerator fabrics 212. Network interface 216 can support Ethernet packets or in addition or alternatively provide a fabric interface (e.g., non-volatile memory express over fabrics (NVMe-oF)), an interface to an interconnect or bus, and so forth.

Figure 2B:
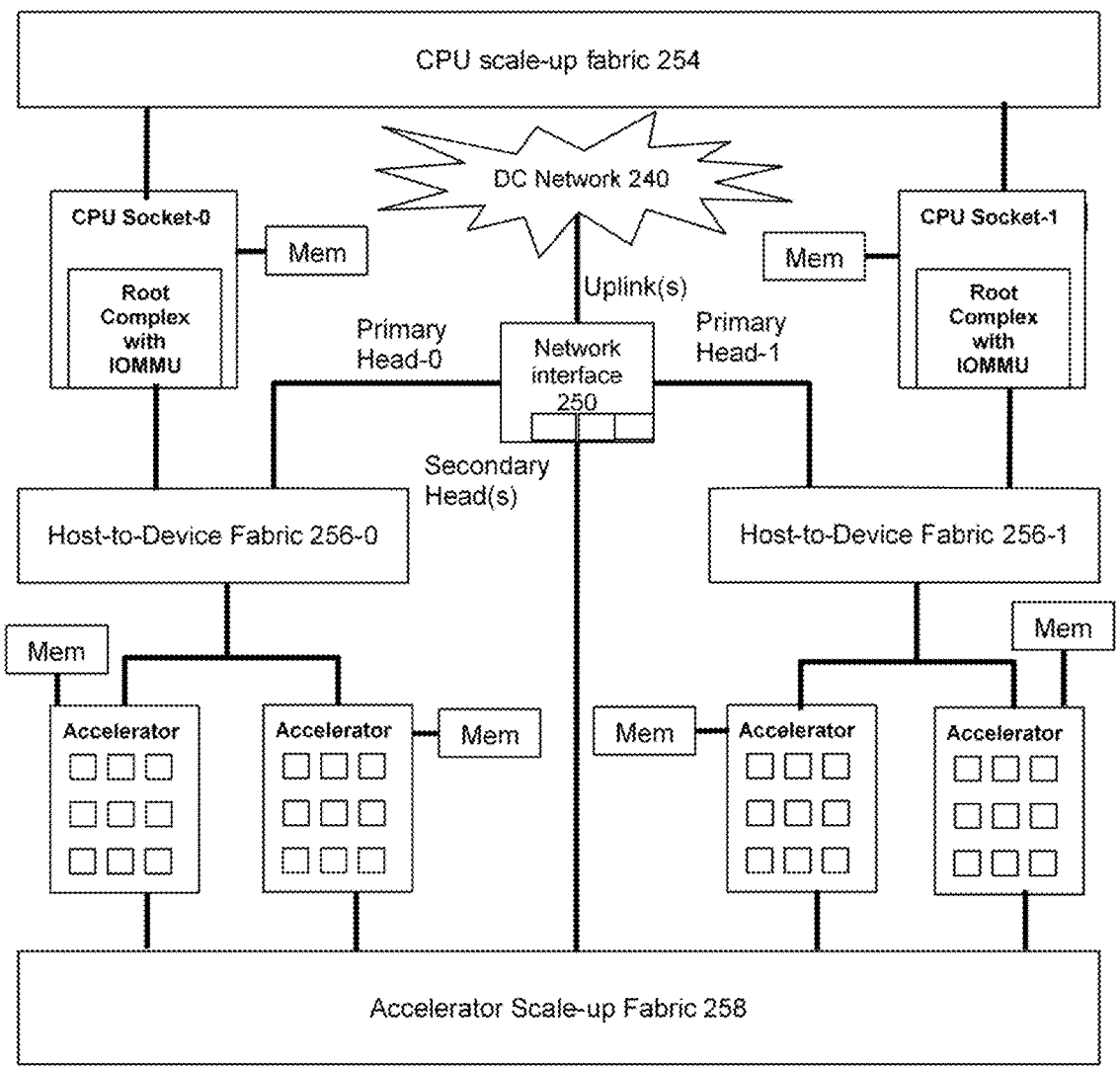
FIG. 2B depicts an example system in which a network interface provides received packets directly to an accelerator fabric for transfer to a memory device.

FIG. 2B depicts an example system. Network interface 250 can couple heterogeneous computing elements of a platform to nodes or devices coupled to a data center (DC) network 240. Heterogeneous computing elements can include general purpose central processing units (CPUs), field programmable gate arrays (FPGAs), graphics processing unit (GPU) based accelerators, and other devices. DC network 240 can be any network or interconnect or bus such as PCI, PCIe, and others. Examples of nodes or devices coupled to a data center (DC) network 240 include computing, memory, or storage elements platforms, computing, memory, or storage elements sleds, racks of computing, memory, or storage elements.

Network interface 250 can be an Ethernet compatible network interface that supports remote direct memory access (RDMA) to a memory buffer via host-to-device fabric 256-0 or 256-1 or accelerator fabric 258. Network interface 250 can support other standards such as InfiniBand. Network interface 250 can be multi-headed and support multiple primary and secondary heads. A head is composed of multiple high bandwidth I/O buses or links (e.g., PCI, PCIe, and so forth). In some examples, a head can be one link from host-to-device fabric or accelerator fabric. A multi-headed network interface can have multiple links, some of which are coupled to host-to-device fabric and some are coupled to an accelerator fabric.

Network interface 250 processes RDMA send/receive requests associated with various memory regions and uses translated addresses to generate the input/output (I/O) requests to primary or secondary fabrics via respective primary or secondary heads. Primary heads of network interface 250 communicate with host-to-device fabric 256-0 or 256-1. Primary heads of network interface 250 can be managed through drivers running on the general purpose processors (e.g., CPU). Additionally, multiple primary heads are used for the I/O non-uniform memory access (NUMA) performance optimizations. Primary and secondary heads of network interface 250 are assigned unique identifiers in their respective fabrics, e.g., Bus:Device:Function in case of PCI fabric.

Network interface 250 can support multi protocols for control plane communication via a host-to-device fabric 256 (e.g., PCIe, compute express link (CXL), and so forth) and protocols for accelerator fabric 258 (e.g., PCIe, Compute Express Link (CXL), NVLink, Coherent Accelerator Processor Interface (CAPI), Cache Coherent Interconnect for Accelerators (CCIX), Gen-Z, and so forth). For example, host-to-device fabrics 256-0 and 256-1 can be compatible with UPI, HyperTransport, QPI, and so forth. Host-to-device fabrics 256-0 or 256-1 can couple CPUs to accelerators, and accelerators to other accelerators. Accelerator scale up fabric 208 can couple accelerators to each other. Both the host-fabric and accelerator fabrics may be logically and physically separate fabrics or logically separate but physically the same fabric. These fabrics can be composed of PCIe, PCI or CXL interconnects. Network interface 250 can support RDMA (e.g., RDMA over Converged Ethernet (RoCE), Internet Wide Area RDMA Protocol (iWARP)) to permit remote access of memory regions and provide large datasets with reduced overhead to accelerator engines that are part of the heterogeneous compute platform. In some examples, RDMA is used for the accelerator traffic using the secondary head(s) for low latency and efficient data movement. But RDMA can be used for direct copies or memory accesses by any device coupled to host-to-device fabric 256-0 or 256-1. Accelerator memory can be addressed using either host physical address (HPA) when using a coherent Host-to-Device fabric (e.g., NVLink or CXL) or unified Device-specific Physical Address (DPA) space, when using a non-coherent Host-to-Device fabric (e.g., PCI-e).

Network interface 250 can be configured to decode destination memory addresses in HPA or DPA depending on the configuration information provided by a control plane application during the RDMA I/O memory configuration. For example, an application running on a CPU sets up a connection to a remote device coupled through data center (DC) network 240. The application sets up control plane operation using a primary head. A control plane application running on the general purpose CPUs or one or more cores can discover various heterogeneous compute elements and the associated physical memory. The application or control plane application can use RDMA verbs to configure memory regions associated with various accelerators in concert with a network interface driver. The control plane application can configure various Quality of Service (QoS) attributes for the RDMA traffic targeted to accelerator fabric 208.

When network interface 250 receives a packet from a remote device via network 240 and uses one or more of a flow identifier, 5tuple, steering tag, and/or destination address to determine if content of the packet is to be copied to a memory buffer via accelerator scale-up fabric 258. Network interface 250 can determine a memory target location based on the physical address. When IOMMU is enabled, the address provided by control plane is not a physical address and hence cannot be decoded directly. As is described later, network interface 250 may translate the address using address translation services (ATS) to obtain a physical address.

To reduce the cost or latency of address translation, a device may implement an address translation cache (ATC) that keeps a copy of the translated physical address. If a cached copy of the translated address is not available, then network interface 250 generates an address translation request via the primary head to get a translated address. Address translation request is serviced by an input-output memory management unit (IOMMU) to translate a virtual or logical address to a physical address. For example, a PCIe compatible address translation unit (ATU) can return a Host physical address (HPA) to network interface 250. Network interface 250 receives an HPA from an IOMMU and decodes a physical memory target in which to write the data. However, if address translation service is not configured with a translated address for the destination address, network interface 250 does not copy the received packet to a destination memory buffer. Instead, other actions can take place such as discarding or dropping the packet, reporting an error to the application, or IOMMU can also present errors to the platform software.

A trusted application running on a CPU can configure address translation tables based on the global view of the platform memory. ATS support on the primary heads enables functional flows over the secondary heads with the required memory address isolation to prevent unauthorized copies to accelerator memory.

For an available translated address, network interface 250 can use a DMA operation to copy a portion of the received packet to a translated memory destination through accelerator scale-up fabric 258 rather than through host-to-device fabric 256-0 or 256-1 to the destination memory. Input/output devices (e.g., network or fabric interfaces), solid state drives (SSDs) are connected to host-to-device fabric 256-0 or 256-1 so host-to-device fabric 256-0 or 256-1 can become overloaded and a bottleneck. Data destined for accelerator can be sent directly to accelerator scale-up fabric 258 to avoid using bandwidth of a host fabric 256.

In some instances, network interface 250 routes a data portion of the packet through a scale-up fabric 258 to a destination memory and a control portion of the packet through a host-to-device fabric 256-0 or 256-1 to a destination memory. Control plane software (not depicted) can configure the routing of portions of received packets (e.g., data or control information) through host-to-device fabric 206 or accelerator scale-up fabric 208.

Depending on the choice of fabric interconnect between the host and scale-up fabrics, accelerator memory can be viewed as a unified host physical address (HPA) space (e.g., using Intel accelerator link (IAL) as an interconnect) or in Unified Device-specific Physical Address (DPA) space (e.g., using PCI as interconnect). For an HPA memory view, a multi-headed network interface 250 supports PCI Address Translation Services (ATS) capability and is used to request pre-translated addresses (HPAs) for the memory addresses targeted on its secondary heads. For a DPA memory view configuration, the control plane application configures memory buffers with hints for the Network Controller to decode I/O addresses accordingly.

An operating system (OS) uses address translation to secure all memory managed by it. For a network interface, the OS does this by providing an IO address to the network interface. The IO address will be translated to HPA before the accessing the memory. For some systems, the accelerator memory may not be part of the OS managed address space. The driver creates an address space for accelerator memory on such systems and this is referred to as Device-specific Physical Address (DPA). A device driver may implement DPA translation (optionally), to provide isolation of accelerator memory. In such case, the driver may provide a guest DPA to the network interface. Note that a network interface can be a physical network interface, network interface controller, or a virtual network interface instance that shares use of a physical network interface.

Accelerator memory can be coupled to an accelerator as a local connected memory using interfaces or buses compatible with standards such any variation of high bandwidth memory (HBM), Double Data Rate (DDR) (e.g., DDR4, DDR5, and so forth), or graphics double data rate (GDDR) (e.g., GDDR4, GDDR5, and so forth). A local connected memory can use a memory bus or interface to connect with an accelerator instead of through a fabric.

Figure 3A:
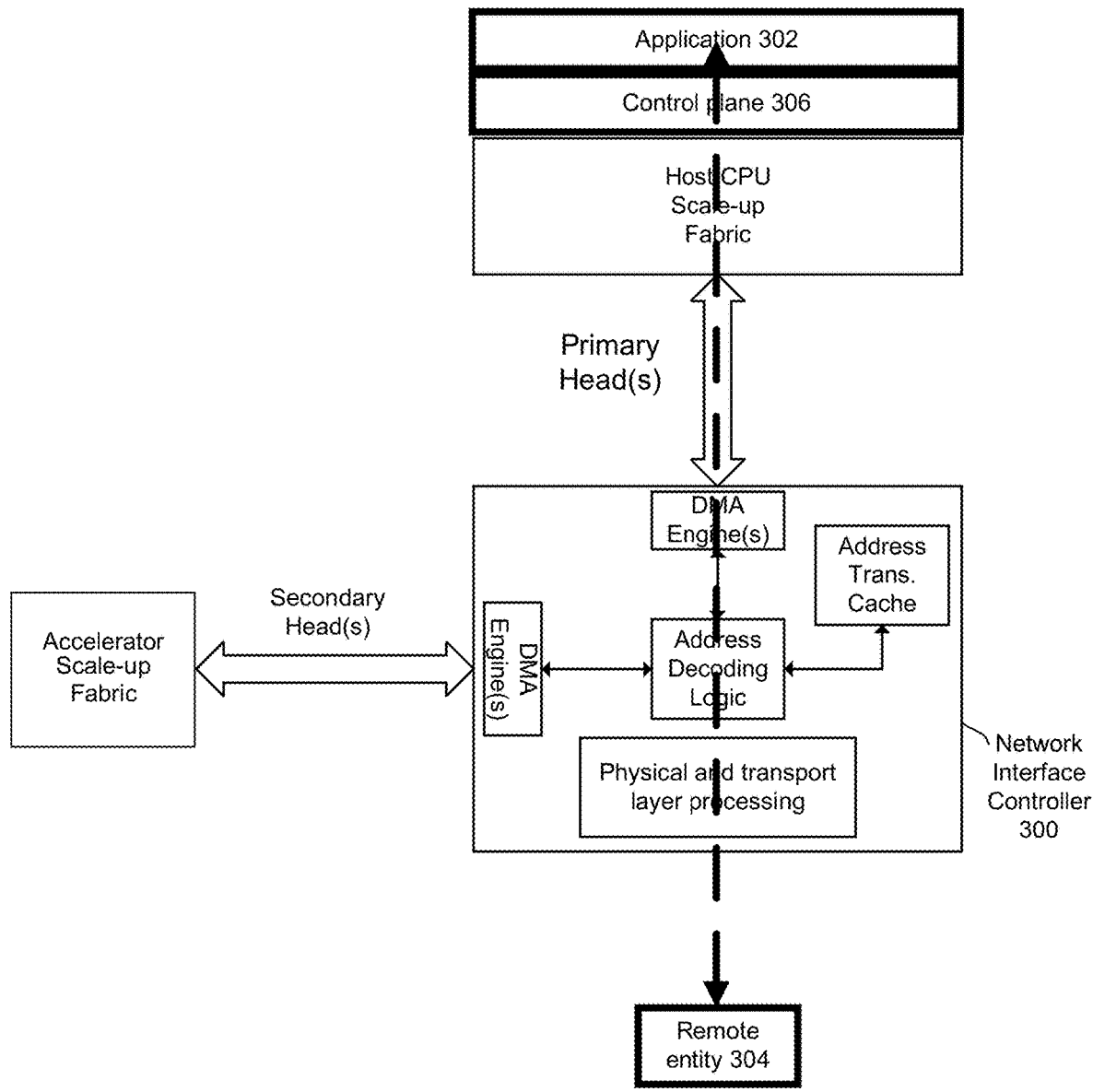
FIG. 3A depicts an example setup operation.

FIGS. 3A-3D depict an example sequence of an enhanced network controller for transferring data or other information in a heterogeneous computing platform. FIG. 3A depicts an example setup operation. Application 302 can request establishment of a remote direct memory access (RDMA) data transfer by remote entity 304 to a memory region accessible by an accelerator device. Protocols other than RDMA can be used such as direct data placement (DDP), InfiniBand, Intel Omni-Path, implementations of RDMA such as RoCE and iWARP, and so forth. Application 302 can use an InfiniBand compatible verbs application program interface (API) to establish a queue-pair with a remote application to enable RDMA writes directly to destination memory while bypassing use of OS to manage copy operations at the receiver. For example, application 302 can use an OpenFabrics Alliance Verbs API to initiate an RDMA write to a memory region accessible by an accelerator device. For example, application 302 can provide an oil or gas high performance computing (HPC) environment, artificial intelligence (AI) training and inference engine, image recognition, voice recognition, augmented reality, virtual reality, and so forth. For example, remote entity 304 can be a user application executing on a mobile or smart phone, an internet connect self-driving control system for a vehicle (e.g., car, bus, van, plane, helicopter).

Host CPU control plane software 306 can perform prework for setting up a descriptor ring and setting up memory buffer addresses in host or accelerator memory space that can receive packets from remote entity 304. A descriptor can specify a destination address of a packet in memory locally attached to an accelerator or other memory. A descriptor can also provide an address that a network interface is to write to indicate a packet has been copied to a destination. An address translation service (described later) is used to determine whether the destination address is in host or accelerator memory. A network interface driver can program a routing table in the network interface that identifies whether to use secondary head for a write to a destination translated address or a read from a target translated address.

In some embodiments, control plane software 306 provides a destination address for a packet in a descriptor and an indication (e.g., indicator bit(s)) of whether the packet is to be written to a destination address using a primary head or secondary head. When a primary head is indicated to be used, the network interface uses IOMMU or a cached address to translate a destination address. When a secondary head is indicated to be used, the network interface DMAs the packet with its DPA (address) to the destination accelerator using the secondary head via an accelerator fabric and the accelerator can interpret the DPA. In some cases, the address is already translated, and the accelerator puts the packet into the assigned accelerator memory destination using the already translated address. In some other cases, the interface device may implement device specific address translation for DPA (address). Similar operations described later can be used by a network interface for a read of data from a memory locally attached to an accelerator.

Control plane software 306 registers a destination address in an address translation service and provides an address translation of a physical or virtual destination address for use to copy content of a received packet bearing the destination address. If no translated address is registered for a destination address provided in a received packet, then no direct copy is performed of a portion of the received packet through an accelerator fabric to a local memory to an accelerator.

Control plane software 306 can manage a routing table that defines transfer of received packets from remote entity 304 to the appropriate memory buffer and completion of descriptors for received packets indicating a packet (or portion thereof) was copied to a destination address in memory. Control plane 306 can manage operation of network interface controller 300 by performing system configuration, management, and exchange of routing table information.

Control plane 306 can exchange topology information with other devices or entities and construct a routing table based on a routing protocol. Control plane 306 can direct traffic via routing rules to prioritize, de-prioritize, block specific types of packets. Control plane packets can be transmitted to the receiver from another entity or locally originated by a network interface or router itself.

Network interface controller 300 can support transmissions and receipts based at least on Ethernet, RDMA (e.g., RoCE or iWARP), Virtual Interface Architecture, InfiniBand, or Omni-Path.

Figure 3B:
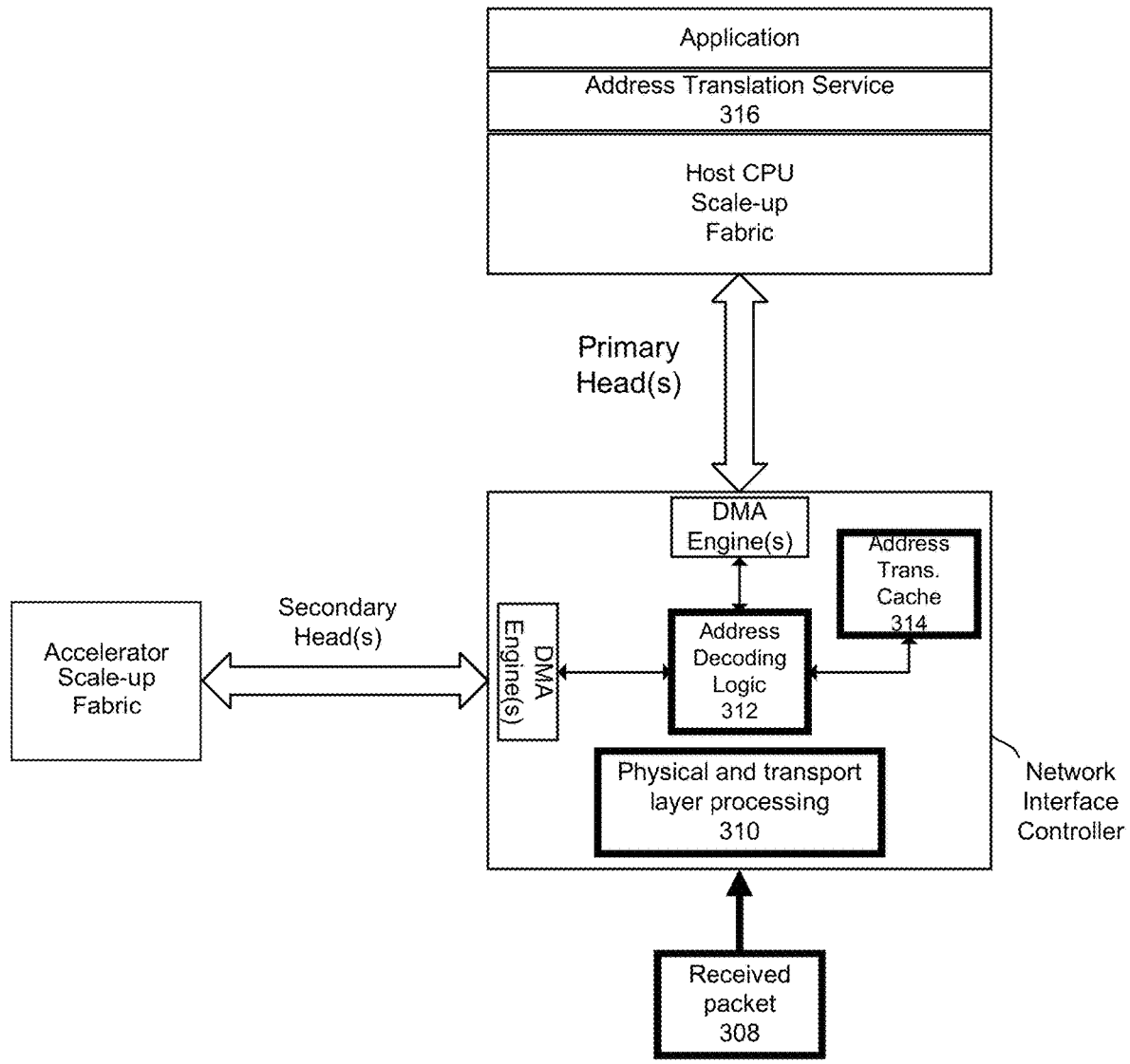
FIG. 3B depicts an example processing of a received packet.

FIG. 3B depicts an example processing of a received packet. Network interface controller 300 receives a packet 308. Received packet 308 can represent one or more packets. Packet 308 can be an Ethernet frame, although other protocols can be used such as TCP/IP. Physical and transport layer processing 310 can perform physical and transport layer processing in accordance with applicable protocols, such as but not limited to encoding or decoding data packets according to applicable physical layer specifications or standards, assembly or disassembly of data based on destination and source addresses along with network control information and error detection hash values. In this example, network interface controller 300 identifies packet 308 is part of an RDMA connection by characteristics of its packet header. Based on received packet header (e.g., tagged buffer, memory address, and length of the remote destination buffer), network interface controller 300 can determine a destination address for a portion of a received packet. On systems where IOMMU is disabled, a destination memory address could be a physical address. On systems where IOMMU is enabled, a destination memory address is an IO Virtual Address (IOVA). An IOVA is to be converted to a physical address that can be decoded to make routing decisions.

Address translation is used to determine if the received packet is capable of direct copying or placement into memory without invoking an operating system or kernel-level processing. Address decoding logic 312 can provide the destination address from packet 308 to request address translation cache 314 to determine if a translated address is available. An IOVA can be translated using PCIe Address Translation Services to obtain a physical address. The physical address can be decoded to make routing decisions (e.g., using secondary or primary head). Some examples use an Address Translation cache to keep a copy of the translated address locally within cache 314. If the translated address is stored in cache 314, then a prior received packet with the same destination address had been validated and received packet 308 can be written directly to memory by network interface controller 300 via accelerator scale-up fabric. In other words, a same destination address for a prior received packet was used by address translation service 316 and the translated address was stored in cache 314. In some cases, translated addresses can be populated into cache 314 and the availability of a cached translated address is because of pre-population. Use of cache 314 can avoid delay and processing expenditures associated with invoking use of address translation service 316. If a translated address is not available for the destination address in cache 314, decoding logic 312 can request address translation service 316 for a translated address.

An ongoing protocol between control plane and cache 314 can be used to invalidate one or more addresses in cache 314 to prevent unauthorized copies to destination memory. An operating system can manage address translation cache entries. A control plane application can use OS APIs to register the buffers and OS can take care of managing the page tables and address translation cache. In addition, control plane can update address translations stored in cache 314 to most likely used such as for connections that receive the most packets.

Figure 3C:
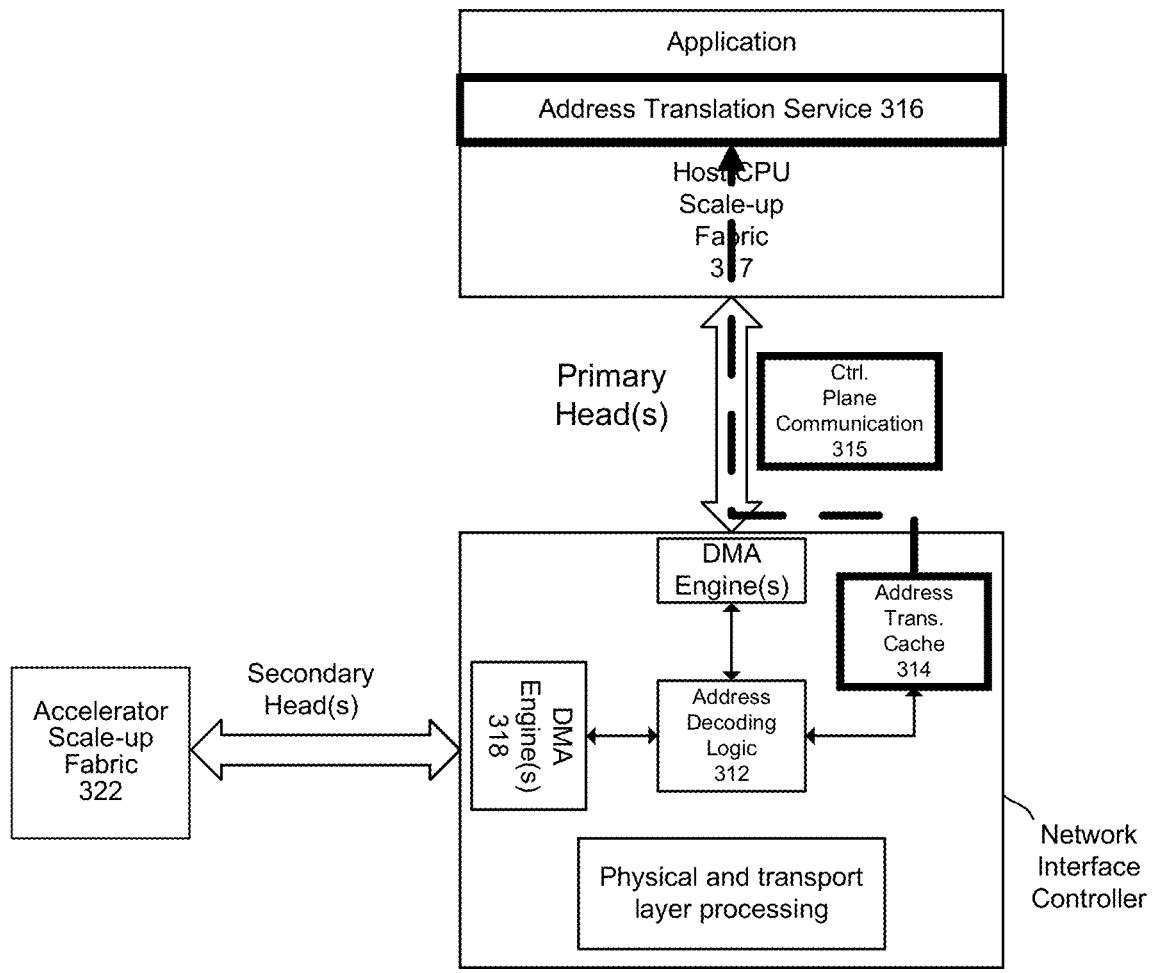
FIG. 3C depicts an example of determining a destination address for a received packet.

FIG. 3C depicts an example of determining a destination address for a received packet. If an address is not in address translation cache 314, translation cache 314 transfers a destination memory address via control plane communication 315 through host CPU scale-up fabric 317 to address translation service 316. In some examples, a primary head of network interface controller 300 is used to communicate with address translation service 312 via a host CPU scale up fabric 317. Address translation service 316 can be implemented as an IOMMU address translation. If address translation service 316 has been provisioned with a translated address for the destination address, the translated address is provided as a response for storage as a pair of destination address and translated address is stored in address translation cache 314.

If address translation service 312 has not been provisioned with a translated address for the destination address, a null is provided as a response and received packet 308 is not direct copied to a memory address. Instead, packet 308 can be processed using the operating system (OS) of a host system or assigned to a destination memory buffer according to applicable schemes. In other examples, packet 308 can be discarded. Accordingly, presence or absence of a translated address for a destination address in a packet can provide for a security feature to prevent direct copies at least where an address translation is not available.

Figure 3D:
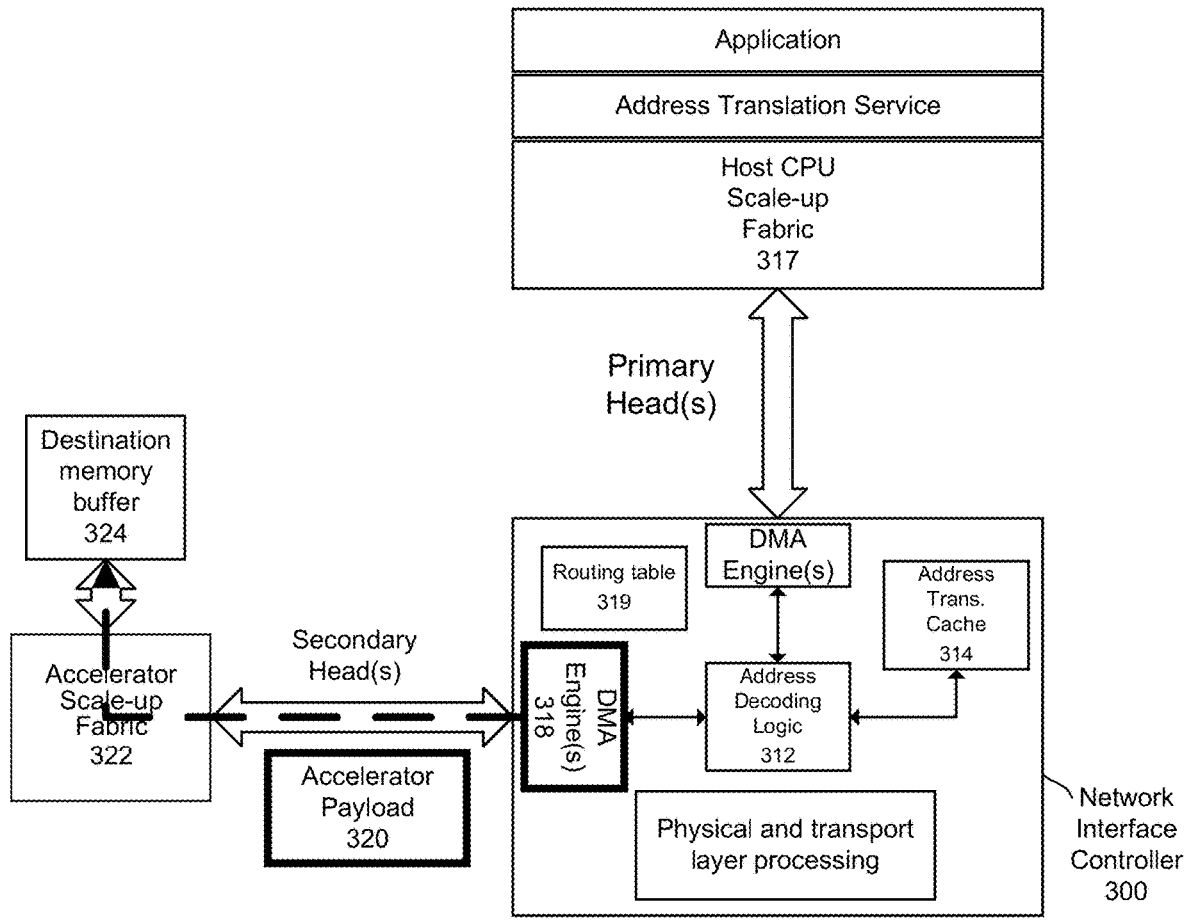
FIG. 3D depicts an example of a transfer of a packet to destination memory address to an accelerator memory.

FIG. 3D depicts an example of a transfer of a packet to destination memory address to an accelerator memory. Network interface controller 300 can use routing table 319 to determine whether a secondary head is to be used based on the translated destination memory address. In this example, a secondary head of network interface controller 300 is used to provide a connection to accelerator scale-up fabric 322 and a destination memory buffer allocated for an accelerator. One or more DMA engines 318 can support direct copy of received data shown as accelerator payload 320 from received packet 308 to a destination memory buffer 324. Destination memory buffer 324 can be a physical or logical addressable region of a memory device that is locally connected to an accelerator device.

Direct memory access (DMA) is a technique that allows an input/output (I/O) device to bypass a central processing unit (CPU) or core, and to send or receive data directly to or from a system memory. Because DMA allows the CPU or core to not manage a copy operation when sending or receiving data to or from the system memory, the CPU or core can be available to perform other operations. Without DMA, when the CPU or core is using programmed input/output, the CPU or core is typically occupied for the entire duration of a read or write operation and is unavailable to perform other work. With DMA, the CPU or core can, for example, initiate a data transfer, and then perform other operations while the data transfer is in progress. The CPU or core can receive an interrupt from a DMA controller when the data transfer is finished.

In some examples, for multiple received packets with the same destination memory address, content of the multiple received packets can be coalesced and copied to a destination memory region in a single DMA operation instead of multiple DMA operations.

After data is processed by an accelerator, the processed data can be sent to a remote entity's memory using a secondary head to copy data from the accelerator memory to the network interface controller through the accelerator fabric, sent to another accelerator memory for additional processing, provided to a CPU for access, retained in memory, copied to storage, or other uses.

Figure 4:
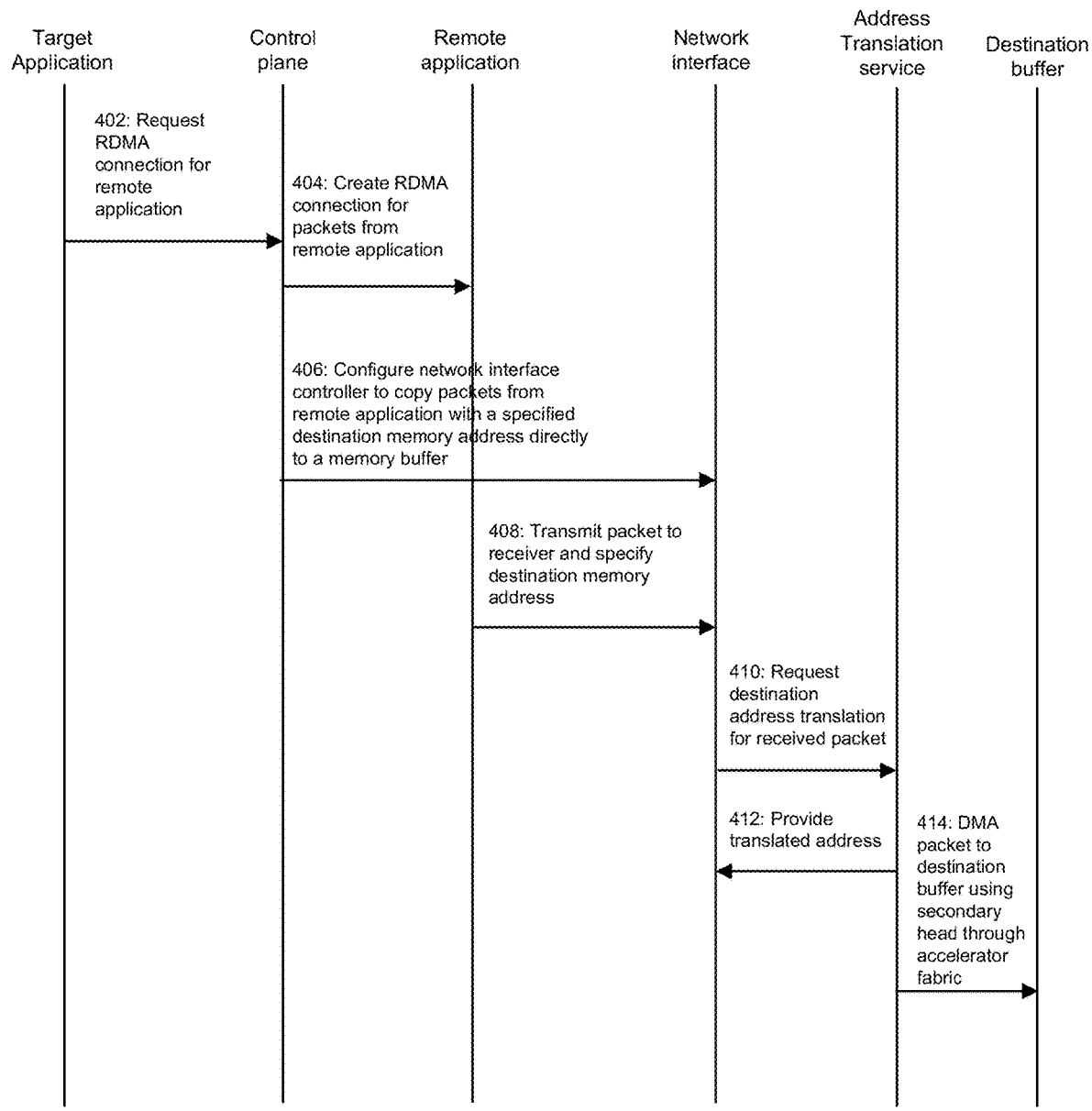
FIG. 4 depicts an example communication sequence.

FIG. 4 depicts an example communication sequence. At 402, a target application can request a control plane for an RDMA connection for a remote application to direct write to a memory region accessible to an accelerator used by the application. For example, the target application can use an RDMA verbs API to initiate RDMA write operations by a remote application to the memory region.

At 404, the control plane creates an RDMA connection for packets from the remote application from a source buffer (not depicted). At 406, the control plane can program the network interface to provide an RDMA copy operation for packets from the remote application to an assigned memory buffer if a destination address provided with the packets corresponds to a valid memory address.

At 408, the remote application can cause packets to be transmitted to a network interface and a memory address associated with an accelerator or processor used by the application. At 410, the network interface receives the packet and, if a cached address translation for a destination address is not available, network interface requests an address translation service to perform an address translation of a destination address specified in the received packet. In some cases, instead of request address translation on a per-packet basis, address translation can be requested for a group of packets with the same specified destination address. At 412, the address translation service provides a translated address to the network interface for one or more packets. An identification of whether a secondary head is to be used by the network interface using a routing table in the network interface or an indication in a descriptor that specifies a destination address for the packet. At 414, the network interface copies one or more packets from a buffer (not depicted) via DMA to a destination buffer specified by the translated address via a secondary head and through an accelerator fabric for access by an accelerator used by an application.

Note that the example provided is such that the destination address provided in a received packet is identified and translated. However, if address translation service was not provisioned to recognize or translate the destination address, no copy operation would take place using a DMA copy and the packet can be discarded. In some cases, if a destination address of the received packet were on a quarantine list or not identified, the packet could be discarded.

Figure 5A:
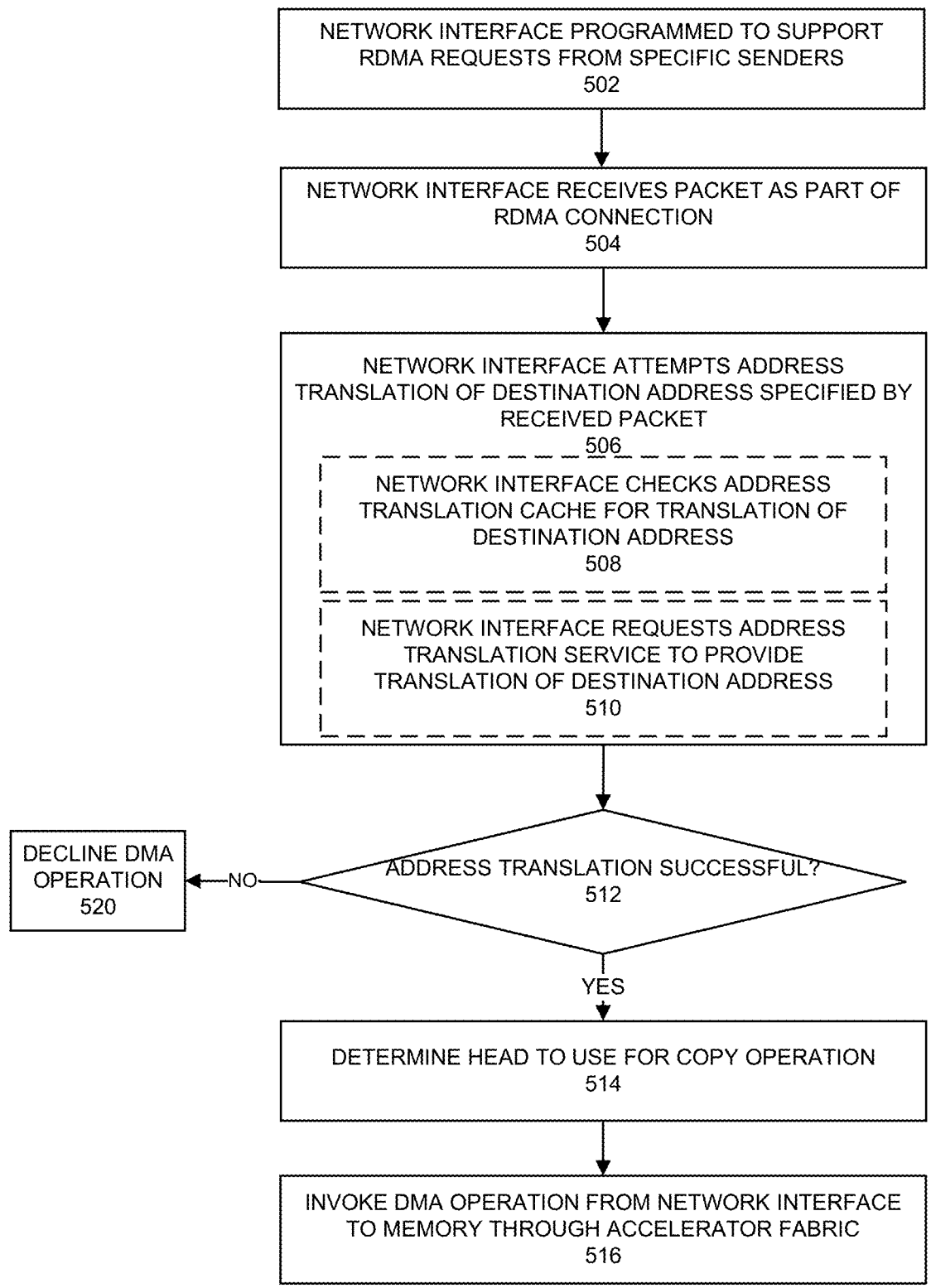
FIGS. 5A-5C depict processes that can be performed by a network interface.

FIG. 5A depicts a process that can be performed by a network interface to copy a received packet in accordance with an embodiment. At 502, a network interface is programmed to support RDMA requests from specific senders. For example, the network interface can be programmed to perform address translation can be requested for destination addresses provided with packets received from particular senders. A sender can be a user application executing on a mobile or smart phone, an internet connect self-driving control system for a vehicle (e.g., car, bus, van, plane, helicopter). At 504, the network interface receives a packet as part of an RDMA connection. At 506, the network interface attempt address translation of a destination address specified in the received packet. For example, action 508 can be performed whereby address translation can include checking if an address translation cache or memory accessible to the network interface stores an association of a destination address and translated address. At 510, if a cached address translation is not available, the network interface can request an address translation service (e.g., IOMMU) to translate a destination address.

At 512, a determination is made as to whether address translation was successful. An address translation can be successful if a translated address is available through either the cache or the address translation service. If the address translation is successful, 514 can follow. At 514, the network interface determines a head to use for the copy a portion of the packet. An identification of whether a secondary head is to be used by the network interface using a routing table in the network interface or an indication in a descriptor that specifies a destination address for the packet. At 516, the network interface invokes a DMA operation to copy a portion of the received packet to the destination memory specified by the translated address via the specified head (e.g., secondary head) and an accelerator fabric. A host-to-device fabric can be avoided to spare the host-to-device fabric from use.

If the address translation is not successful, 520 can follow. At 520, the network interface does not cause a DMA of the received packet to a destination memory buffer without invoking use of a CPU, OS, or network interface driver. Instead, the packet can be discarded, routed to another destination address determined by a CPU, OS, or network interface driver.

Figure 5B:
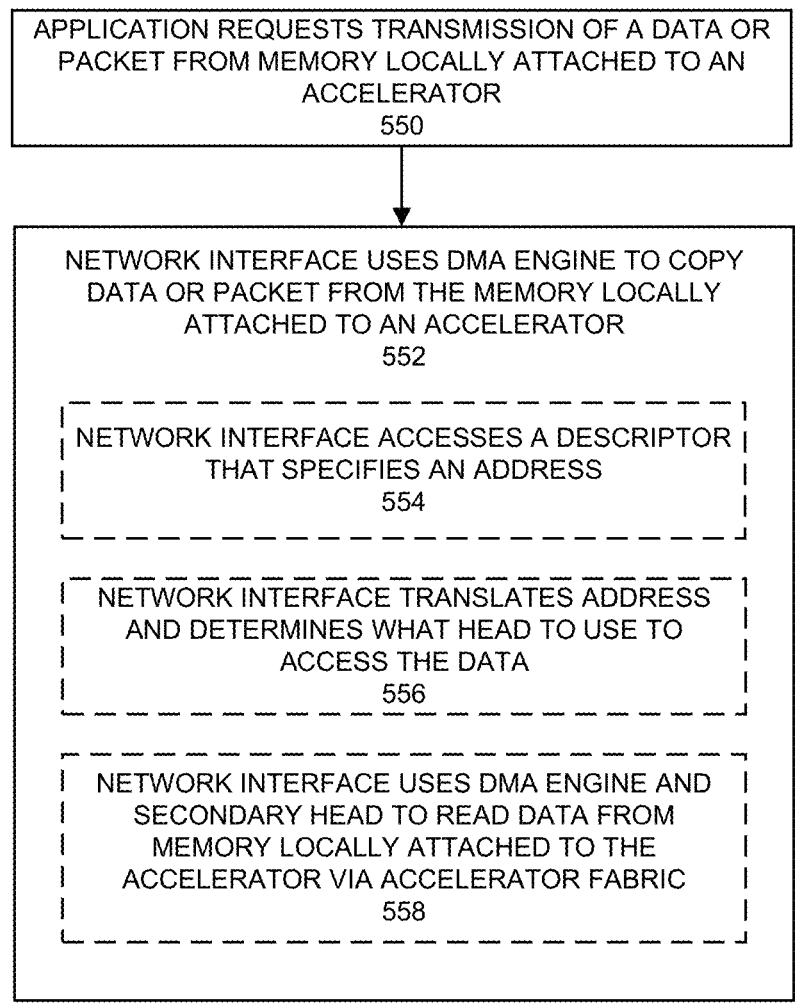

FIG. 5B depicts a process that can be performed by a network interface for a packet transmission in accordance with an embodiment. At 550, an application requests transmission of data or a packet from a memory locally attached to an accelerator. The destination device or memory for the data or packet can be specified in a descriptor received at the network interface. At 552, the network interface can use a DMA engine to copy the data from the memory locally attached to an accelerator via an accelerator fabric. In some examples, 552 includes 554-558 or 560-562. At 554, a network interface can access a descriptor that specifies an IOVA (address). At 556, the network interface can translate the IOVA (address) using an IOMMU or ATC and use a routing table to identify a secondary head to use to access the data. At 558, the network interface can use a DMA engine and a secondary head to read the data from the memory locally attached to an accelerator using an accelerator fabric.

Figure 5C:
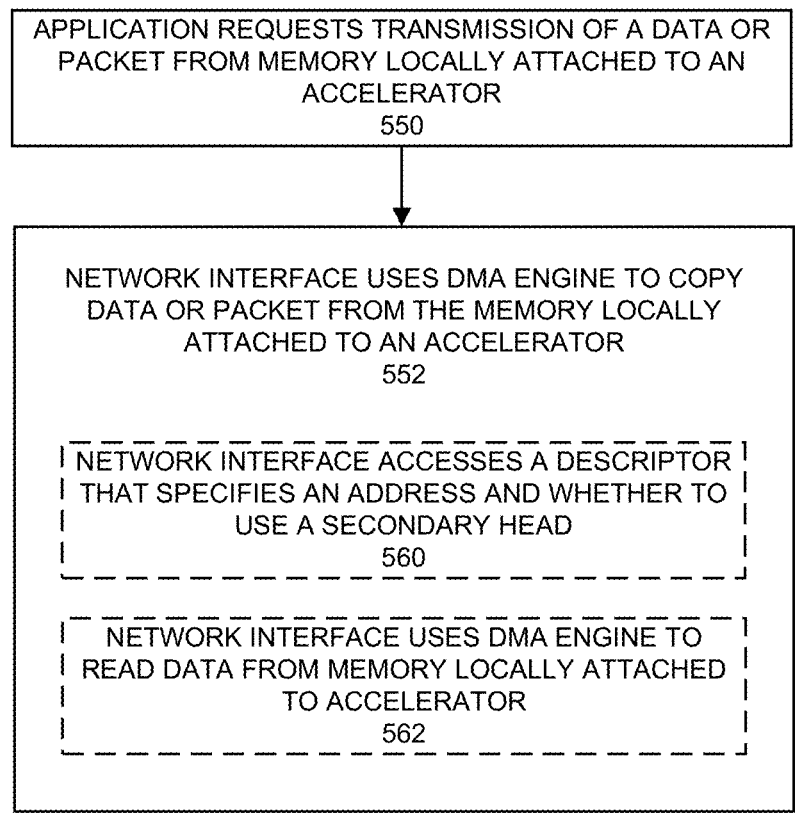

FIG. 5C depicts actions 560 and 562 that can be performed in connection with 552. At 560, a network interface can access a descriptor that specifies an IOVA (address) and also indicates the network interface is to use secondary head to transport the data or a packet using an accelerator fabric. At 562, a DMA engine of the network interface reads the data using the secondary head and using an accelerator fabric from the memory locally attached to an accelerator.

Thereafter, the network interface can transmit the data in a packet or the packet to a destination device or memory.

Figure 6:
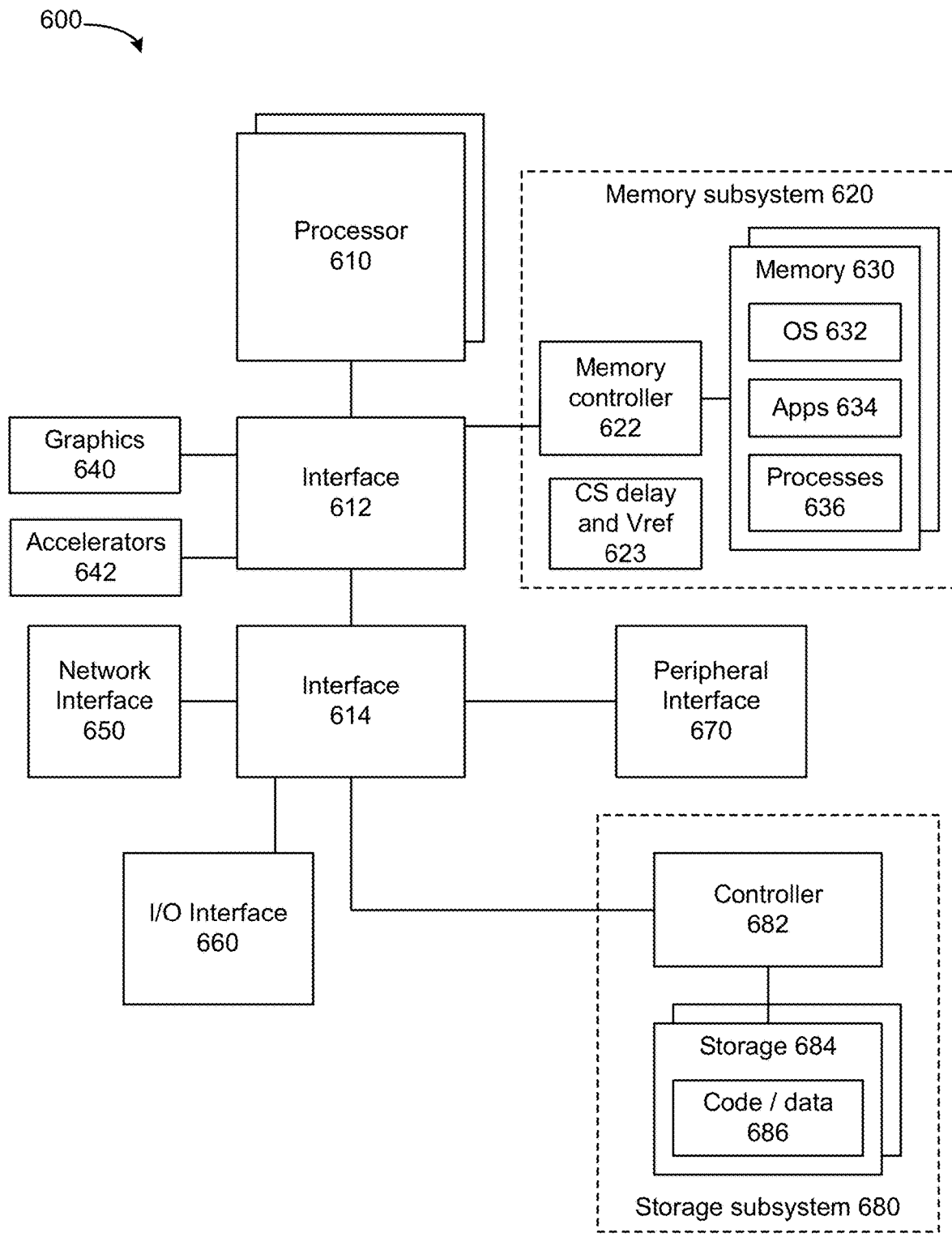
FIG. 6 depicts a system.

FIG. 6 depicts a system. The system can use embodiments described herein to allocate accelerator traffic to an accelerator memory via an accelerator fabric instead of using a host-to-device fabric. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 7:
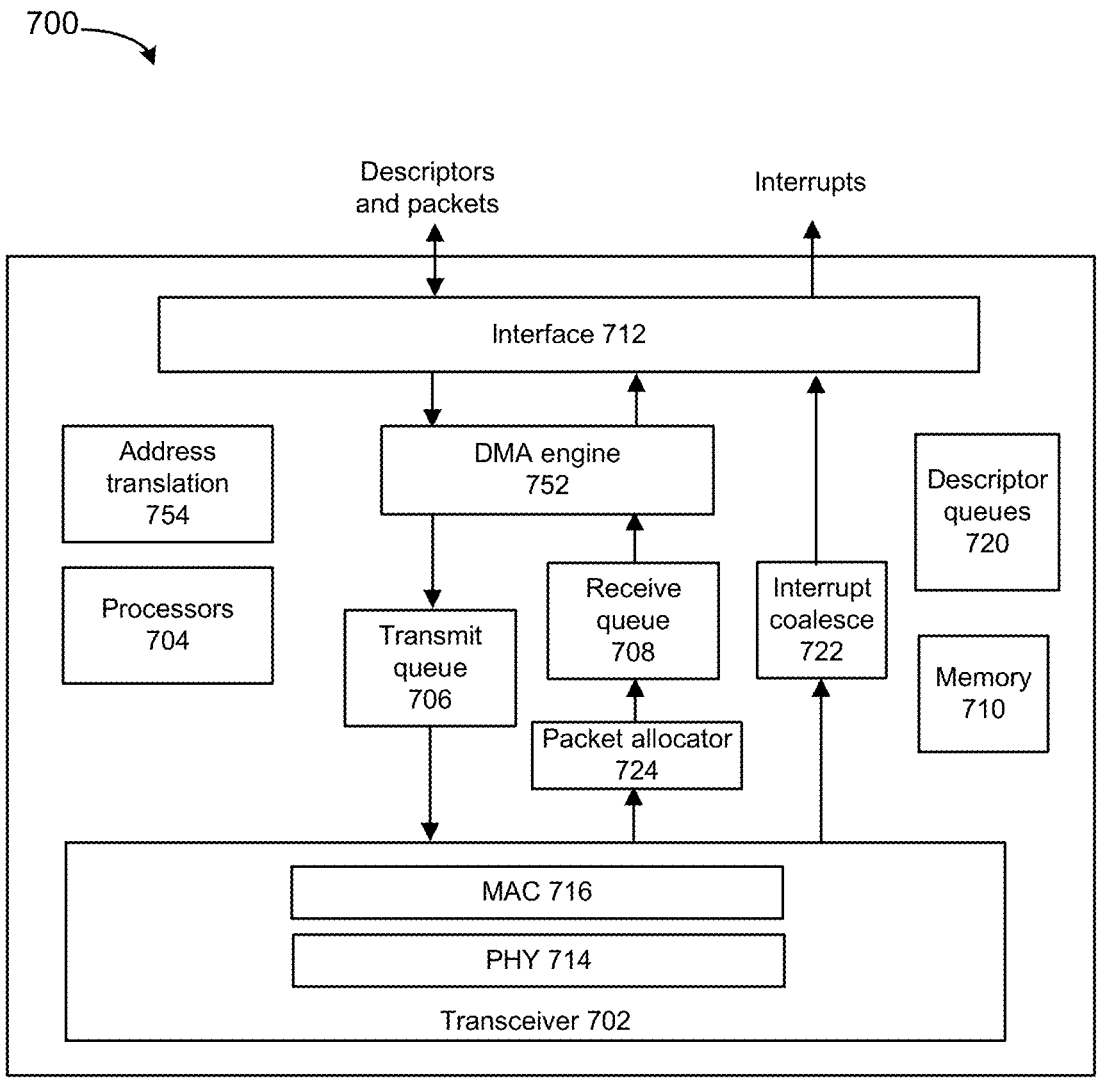
FIG. 7 depicts a network interface that can use embodiments or be used by embodiments.

FIG. 7 depicts a network interface that can use embodiments or be used by embodiments. Network interface 700 can include transceiver 702, processors 704, transmit queue 706, receive queue 708, memory 710, and bus interface 712, and DMA engine 752. Transceiver 702 can be capable of receiving and transmitting packets in conformance with the applicable protocols such as Ethernet as described in IEEE 802.3, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets according to applicable physical layer specifications or standards. MAC circuitry 716 can be configured to assemble data to be transmitted into packets, that include destination and source addresses along with network control information and error detection hash values. Processors 704 can be any a combination of a: processor, core, graphics processing unit (GPU), field programmable gate array (FPGA), application specific integrated circuit (ASIC), or other programmable hardware device that allow programming of network interface 700. For example, processors 704 can provide for identification of a resource to use to perform a workload and generation of a bitstream for execution on the selected resource. For example, a "smart network interface" can provide packet processing capabilities in the network interface using processors 704.

Packet allocator 724 can provide distribution of received packets for processing by multiple CPUs or cores using timeslot allocation described herein or RSS. When packet allocator 724 uses RSS, packet allocator 724 can calculate a hash or make another determination based on contents of a received packet to determine which CPU or core is to process a packet.

Interrupt coalesce 722 can perform interrupt moderation whereby network interface interrupt coalesce 722 waits for multiple packets to arrive, or for a time-out to expire, before generating an interrupt to host system to process received packet(s). Receive Segment Coalescing (RSC) can be performed by network interface 700 whereby portions of incoming packets are combined into segments of a packet. Network interface 700 provides this coalesced packet to an application.

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device. Address translation 754 can be used to determine whether a translation of an address provided with a received packet is available in a cache of network interface 700.

Memory 710 can be any type of volatile or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708 and corresponding destination memory regions. Bus interface 712 can provide an interface with host device (not depicted). For example, bus interface 712 can be compatible with PCI, PCI Express, PCI-x, Serial ATA, and/or USB compatible interface (although other interconnection standards may be used).

Figure 8:
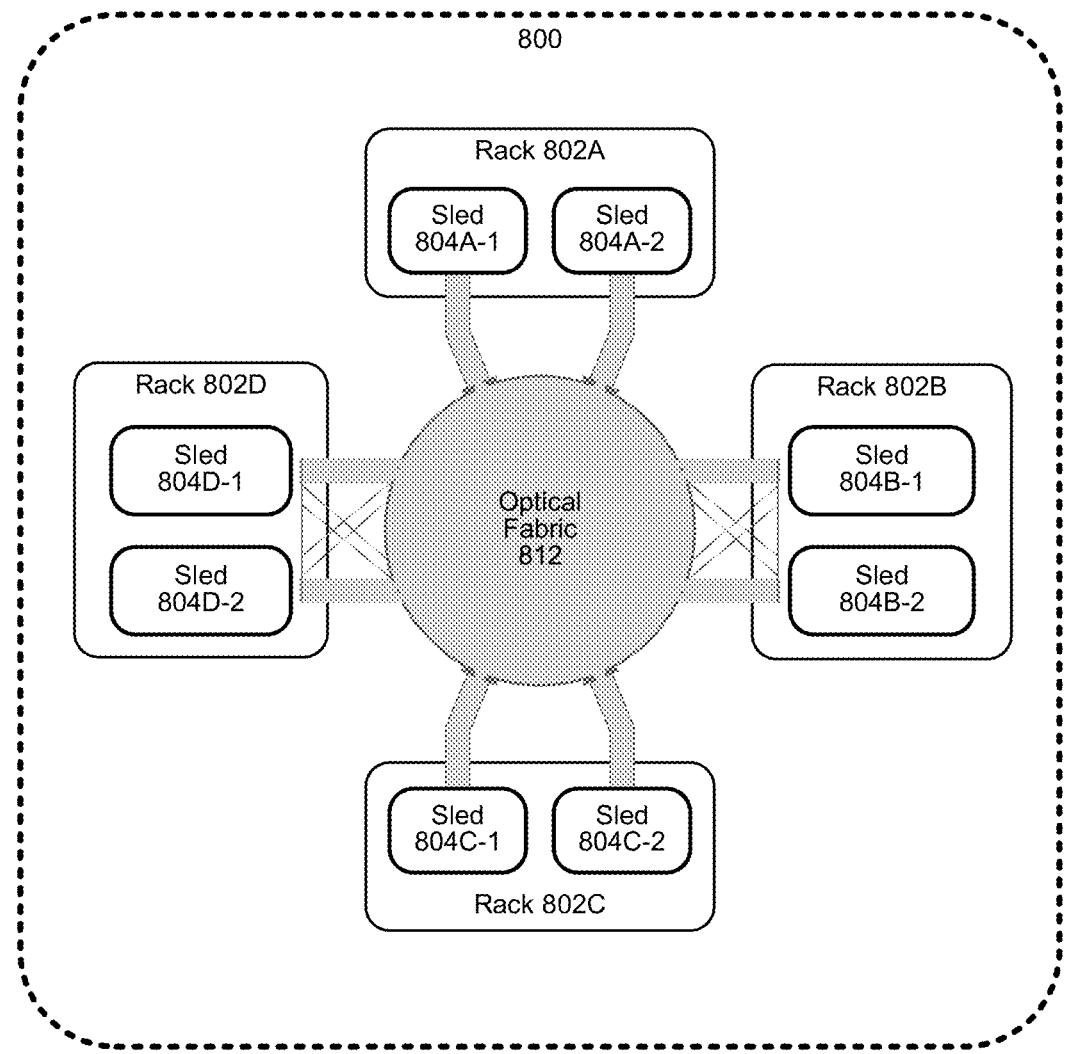
FIG. 8 depicts an example of a data center.

FIG. 8 depicts an example of a data center. Various embodiments can be used in or with the data center of FIG. 8 to provide data transfers to memory via accelerator fabrics.

As shown in FIG. 8, data center 800 may include an optical fabric 812. Optical fabric 812 may generally include a combination of optical signaling media (such as optical cabling) and optical switching infrastructure via which any particular sled in data center 800 can send signals to (and receive signals from) the other sleds in data center 800. The signaling connectivity that optical fabric 812 provides to any given sled may include connectivity both to other sleds in a same rack and sleds in other racks. Data center 800 includes four racks 802A to 802D and racks 802A to 802D house respective pairs of sleds 804A-1 and 804A-2, 804B-1 and 804B-2, 804C-1 and 804C-2, and 804D-1 and 804D-2. Thus, in this example, data center 800 includes a total of eight sleds. Optical fabric 812 can provide sled signaling connectivity with one or more of the seven other sleds. For example, via optical fabric 812, sled 804A-1 in rack 802A may possess signaling connectivity with sled 804A-2 in rack 802A, as well as the six other sleds 804B-1, 804B-2, 804C-1, 804C-2, 804D-1, and 804D-2 that are distributed among the other racks 802B, 802C, and 802D of data center 800. The embodiments are not limited to this example. For example, fabric 812 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a network interface for comprising: an interface to a host-to-device fabric; an interface to an accelerator fabric; and at least one processor to: process a received packet to determine a destination memory location; request address translation of the destination memory location; request a decode of the address translation to determine a head to use from among a primary or one or more secondary heads; and based on availability of an address translation of the destination memory location and the determined head indicating a secondary head, permit copy of a portion of the received packet to a memory locally attached to the accelerator via the accelerator fabric.

Example 2 includes any example and includes at least one port to receive or send packets and a direct memory access (DMA) engine to copy a received packet to a memory buffer via the host-to-device fabric or to copy, via the accelerator fabric, a portion of a received packet to a memory locally attached to an accelerator.

Example 3 includes any example and includes an address cache and wherein the at least one processor is to: determine if the address cache stores the destination memory location and address translation and based on the address cache not storing an address translation for the destination memory location, cause transmission of a request for address translation to an address translation service.

Example 4 includes any example, wherein the address translation service comprises input-output memory management unit (IOMMU).

Example 5 includes any example, wherein the at least one processor is to: based on the address translation service indicating no address translation for the destination memory location, discard the received packet.

Example 6 includes any example, wherein the at least one processor is to: based on the address translation service providing an address translation for the destination memory location and the determined head identifying a head to use, cause use of the DMA engine to copy a portion of the received packet to a memory buffer associated with the address translation.

Example 7 includes any example and includes an accelerator fabric coupled to the network interface, an accelerator coupled to the accelerator fabric, and memory locally attached to the accelerator, the memory locally attached to the accelerator to receive the portion of the received packet.

Example 8 includes any example and includes a host-to-device fabric coupled to the network interface, a central processing unit (CPU) coupled to the host-to-device fabric, and an accelerator coupled to the host-to-device fabric.

Example 9 includes any example and includes an interface to a data center network, the interface to a data center network to receive packets from a remote entity for copying to a memory buffer.

Example 10 includes any example and wherein an accelerator comprises one or more of: general purpose graphics processing units (GPGPUs), graphics processing unit (GPU), compression, cryptography, hash/authentication, decryption, image recognition, speech recognition, or neural network-based inferences.

Example 11 includes any example and includes a rack, server, data center, or sled.

Example 12 includes a computer-implemented method comprising: configuring a network interface to determine whether to direct copy a portion of a received packet from a remote entity to a memory buffer associated with an accelerator via an accelerator fabric, wherein the accelerator fabric provides communicative coupling among one or more accelerators; receiving a packet from the remote entity at the network interface, the packet including a destination memory address; determining if an address translation for a destination memory address of the packet is available; determining a head to use to transfer a portion of the packet; based on the address translation being available and a determined head, performing a direct memory access (DMA) copy operation of a portion of the packet to a memory buffer associated with the address translation via the accelerator fabric; and based on the address translation not being available, discarding the packet.

Example 13 includes any example and wherein configuring a network interface to determine whether to direct copy a portion of a received packet from a remote entity to a memory buffer via an accelerator fabric comprises using a control plane software.

Example 14 includes any example and wherein determining if an address translation for a destination memory address of the packet is available comprises checking if a cached copy of an address translation of a destination memory address is available at the network interface and based on a cached copy of an address translation of a destination memory address not being available at the network interface, requesting an address translation service for an address translation of the destination memory address via a host-to-device fabric.

Example 15 includes any example and wherein the address translation service comprises an input-output memory management unit (IOMMU).

Example 16 includes any example and wherein the accelerator fabric is coupled to at least one memory and at least one accelerator device and wherein a memory is locally attached to an accelerator device.

Example 17 includes any example and includes: based on the received packet not being associated with a memory buffer associated with an accelerator, using a direct memory access (DMA) to copy a portion of the received packet to a memory buffer associated with a core via a host-to-device fabric, wherein the host-to-device fabric couples cores to accelerators.

Example 18 includes a system comprising: a network interface controller; a host-to-device fabric coupled to the network interface controller, the host-to-device fabric to provide communicative coupling between a central processing unit and an accelerator; an accelerator fabric coupled to the network interface controller, the accelerator fabric to provide communicative coupling between a multiple accelerators; a memory coupled to an accelerator device, wherein the network interface controller comprises at least one direct memory access (DMA) engine and the network interface is configured to: determine whether to direct copy a portion of a received packet from a remote entity to a memory buffer associated with an accelerator via an accelerator fabric, wherein the accelerator fabric provides communicative coupling among one or more accelerators, process a received packet to determine an associated destination memory location, request address translation of the destination memory location, determine a head to use to transfer a portion of the received packet from among a primary head and a secondary head, and based on availability of an address translation of the destination memory location and a determined head being a secondary head, permit direct copy of a portion of the received packet to a memory buffer associated with the address translation using a DMA engine via an accelerator fabric.

Example 19 includes any example and wherein determine whether to direct copy a portion of a received packet from a remote entity to a memory buffer associated with an accelerator via an accelerator fabric comprises a determination if a cached copy of an address translation of a destination memory address is available at the network interface and based on a cached copy of an address translation of a destination memory address not being available at the network interface, request an address translation service for an address translation of the destination memory address via the host-to-device fabric.

Example 20 includes any example and wherein the address translation comprises an input-output memory management unit (IOMMU).

Example 21 includes any example and wherein the network interface is configured to: based on the received packet not being associated with a memory buffer associated with an accelerator, use a DMA engine to copy a portion of the received packet to a memory buffer associated with a core via a host-to-device fabric.

Example 22 includes any example and wherein to process a received packet to determine an associated destination memory location, the network interface is to access a descriptor that specifies a destination address and wherein if the network interface determines to use a secondary head, the network interface is to use a direct memory access (DMA) engine to copy a portion of the received packet to a memory buffer associated with the address translation via an accelerator fabric using the secondary head.

Example 23 includes any example and wherein to process a received packet to determine an associated destination memory location, the network interface is to access a descriptor that specifies a destination address and whether to use a secondary head, and the network interface is to use a direct memory access (DMA) engine to copy a portion of the received packet to a memory buffer associated with the address translation via an accelerator fabric using the secondary head based on the descriptor specifying to use the secondary head.

Example 24 includes any example and wherein the memory buffer is in a memory that is locally attached to an accelerator device.

What is claimed is:

1. Network interface controller circuitry configurable for use in a host node and in association with a device driver, the host node comprising at least one graphics processing unit (GPU)-accessible memory, at least one host memory, and at least one host fabric, the host node to be communicatively coupled via at least one multi-switch fabric to a remote system, the remote system comprising at least one other GPU-accessible memory, at least one other host memory, and at least one other host fabric, the network interface controller circuitry comprising:
  network interface circuitry for use in Remote Direct Memory Access (RDMA) over Converged Ethernet (RoCE) packet data communication with the remote system via the at least one multi-switch fabric, the ROCE packet data communication to indicate at least one RDMA write to the host node from the remote system and/or at least one RDMA read from the host node to the remote system, the ROCE packet data communication to be initiated in response, at least in part, to at least one host application request; and
  programmable circuitry to perform operations comprising:
    in event that the ROCE packet data communication indicates the at least one RDMA write, directly writing, via the at least one host fabric, received packet data to the at least one GPU-accessible memory;
    in event that the ROCE packet data communication indicates the at least one RDMA read, directly reading, via the at least one host fabric, other data from the at least one GPU-accessible memory that is to be provided to the remote system via the ROCE packet data communication; and
    encryption, decryption, and compression-related host central processing unit (CPU) offload operations;
  wherein:
    the writing and the reading are to be performed in a manner that bypasses both (1) host CPU and/or host operating system (OS) in the writing and the reading, and (2) copying of the received packet data and the other data to the at least one host memory of the host node;
    the writing and/or the reading are configurable to comprise use of direct data placement (DDP);
    the writing and/or the reading are configurable to comprise use of address translation;
    the address translation is to be implemented, at least in part, using the device driver;
    portions of the received packet data and/or the other data are to be routed to their destinations via respective fabric-associated routings;
    the respective fabric-associated routings are configurable to be mutually different from each other, at least in part; and
    the at least one multi-switch fabric is to communicatively couple multiple switches associated with the host node and the remote system.

2. The network interface controller circuitry of claim 1, wherein:
  prior to being received by the programmable circuitry, the received packet data is to be directly read from the at least one other GPU-accessible memory via the at least one other host fabric in a manner that bypasses both (1) remote system CPU and/or remote system OS in the remote system, and (2) copying of the received packet data to the at least one other host memory.

3. The network interface controller circuitry of claim 2, wherein:
  the at least one host fabric comprises Peripheral Component Interconnect Express (PCIe) interconnect; and
  the network interface controller circuitry is to be comprised in a circuit board that is to be communicatively coupled to the PCIe interconnect.

4. The network interface controller circuitry of claim 3, wherein:
  the received packet data and/or the other data are for use in association with artificial intelligence and/or machine learning.

5. The network interface controller circuitry of claim 4, wherein:
  the host node and the remote system each comprise multiple respective graphics processing units;
  the at least one GPU-accessible memory is accessible by the multiple respective graphics processing units of the host node; and
  the at least one other GPU-accessible memory is accessible by the multiple respective graphics processing units of the remote system.

6. The network interface controller circuitry of claim 1, wherein:
  the programmable circuitry is also for use in association with memory isolation.

7. The network interface controller circuitry of claim 1, wherein:
  at least one application specific integrated circuit (ASIC) comprises the programmable circuitry; and
  the at least one host fabric comprises at least one accelerator fabric.

8. A method to be implemented using network interface controller circuitry, the network interface controller circuitry to be configured for use in a host node and in association with a device driver, the host node comprising at least one graphics processing unit (GPU)-accessible memory, at least one host memory, and at least one host fabric, the host node to be communicatively coupled via at least one multi-switch fabric to a remote system, the remote system comprising at least one other GPU-accessible memory, at least one other host memory, and at least one other host fabric, the network interface controller circuitry comprising network interface circuitry and programmable circuitry, the method comprising:
  using the network interface circuitry in Remote Direct Memory Access (RDMA) over Converged Ethernet (RoCE) packet data communication with the remote system via the at least one multi-switch fabric, the ROCE packet data communication to indicate at least one RDMA write to the host node from the remote system and/or at least one RDMA read from the host node to the remote system, the ROCE packet data communication to be initiated in response, at least in part, to at least one host application request; and
  using the programmable circuitry to perform operations comprising:
    in event that the ROCE packet data communication indicates the at least one RDMA write, directly writing, via the at least one host fabric, received packet data to the at least one GPU-accessible memory;
    in event that the ROCE packet data communication indicates the at least one RDMA read, directly reading, via the at least one host fabric, other data from the at least one GPU-accessible memory that is to be provided to the remote system via the ROCE packet data communication; and
    encryption, decryption, and compression-related host central processing unit (CPU) offload operations;
  wherein:
    the writing and the reading are to be performed in a manner that bypasses both (1) host CPU and/or host operating system (OS) in the writing and the reading, and (2) copying of the received packet data and the other data to the at least one host memory of the host node;

the writing and/or the reading are configurable to comprise use of direct data placement (DDP);

the writing and/or the reading are configurable to comprise use of address translation;

the address translation is to be implemented, at least in part, using the device driver;

portions of the received packet data and/or the other data are to be routed to their destinations via respective fabric-associated routings;

the respective fabric-associated routings are configurable to be mutually different from each other, at least in part; and the at least one multi-switch fabric is to communicatively couple multiple switches associated with the host node and the remote system.

9. The method of claim 8, wherein:

prior to being received by the programmable circuitry, the received packet data is to be directly read from the at least one other GPU-accessible memory via the at least one other host fabric in a manner that bypasses both (1) remote system CPU and/or remote system OS in the remote system, and (2) copying of the received packet data to the at least one other host memory.

10. The method of claim 9, wherein:

the at least one host fabric comprises Peripheral Component Interconnect Express (PCIe) interconnect; and the network interface controller circuitry is to be comprised in a circuit board that is to be communicatively coupled to the PCIe interconnect.

11. The method of claim 10, wherein:

the received packet data and/or the other data are for use in association with artificial intelligence and/or machine learning.

12. The method of claim 11, wherein:

the host node and the remote system each comprise multiple respective graphics processing units;

the at least one GPU-accessible memory is accessible by the multiple respective graphics processing units of the host node; and the at least one other GPU-accessible memory is accessible by the multiple respective graphics processing units of the remote system.

13. The method of claim 8, wherein:

the programmable circuitry is also for use in association with memory isolation.

14. The method of claim 8, wherein:

at least one application specific integrated circuit (ASIC) comprises the programmable circuitry; and the at least one host fabric comprises at least one accelerator fabric.

15. At least one non-transitory machine-readable storage medium storing instructions to be executed by at least one machine associated with network interface controller circuitry, the network interface controller circuitry to be configured for use in a host node and in association with a device driver, the host node comprising at least one graphics processing unit (GPU)-accessible memory, at least one host memory, and at least one host fabric, the host node to be communicatively coupled via at least one multi-switch fabric to a remote system, the remote system comprising at least one other GPU-accessible memory, at least one other host memory, and at least one other host fabric, the network interface controller circuitry comprising network interface circuitry and programmable circuitry, the instructions, when executed by the at least one machine, resulting in performance of operations comprising:

using the network interface circuitry in Remote Direct Memory Access (RDMA) over Converged Ethernet (RoCE) packet data communication with the remote system via the at least one multi-switch fabric, the ROCE packet data communication to indicate at least one RDMA write to the host node from the remote system and/or at least one RDMA read from the host node to the remote system, the ROCE packet data communication to be initiated in response, at least in part, to at least one host application request; and using the programmable circuitry to perform a set of operations comprising:

in event that the ROCE packet data communication indicates the at least one RDMA write, directly writing, via the at least one host fabric, received packet data to the at least one GPU-accessible memory;

in event that the ROCE packet data communication indicates the at least one RDMA read, directly reading, via the at least one host fabric, other data from the at least one GPU-accessible memory that is to be provided to the remote system via the ROCE packet data communication; and encryption, decryption, and compression-related host central processing unit (CPU) offload operations;

wherein:

the writing and the reading are to be performed in a manner that bypasses both (1) host CPU and/or host operating system (OS) in the writing and the reading, and (2) copying of the received packet data and the other data to the at least one host memory of the host node;

the writing and/or the reading are configurable to comprise use of direct data placement (DDP);

the writing and/or the reading are configurable to comprise use of address translation;

the address translation is to be implemented, at least in part, using the device driver;

portions of the received packet data and/or the other data are to be routed to their destinations via respective fabric-associated routings;

the respective fabric-associated routings are configurable to be mutually different from each other, at least in part; and the at least one multi-switch fabric is to communicatively couple multiple switches associated with the host node and the remote system.

16. The at least one non-transitory machine-readable storage medium of claim 15, wherein:

prior to being received by the programmable circuitry, the received packet data is to be directly read from the at least one other GPU-accessible memory via the at least one other host fabric in a manner that bypasses both (1) remote system CPU and/or remote system OS in the remote system, and (2) copying of the received packet data to the at least one other host memory.

17. The at least one non-transitory machine-readable storage medium of claim 16, wherein:

the at least one host fabric comprises Peripheral Component Interconnect Express (PCIe) interconnect; and the network interface controller circuitry is to be comprised in a circuit board that is to be communicatively coupled to the PCIe interconnect.

18. The at least one non-transitory machine-readable storage medium of claim 17, wherein:

the received packet data and/or the other data are for use in association with artificial intelligence and/or machine learning.

19. The at least one non-transitory machine-readable storage medium of claim 18, wherein:
the host node and the remote system each comprise multiple respective graphics processing units;
the at least one GPU-accessible memory is accessible by the multiple respective graphics processing units of the host node; and
the at least one other GPU-accessible memory is accessible by the multiple respective graphics processing units of the remote system.

20. The at least one non-transitory machine-readable storage medium of claim 15, wherein:
the programmable circuitry is also for use in association with memory isolation.

21. The at least one non-transitory machine-readable storage medium of claim 15, wherein:
at least one application specific integrated circuit (ASIC) comprises the programmable circuitry; and
the at least one host fabric comprises at least one accelerator fabric.

22. A host system to be communicatively coupled via at least one multi-switch fabric to a remote system, the host system comprising:
at least one graphics processing unit (GPU)-accessible memory;
at least one host memory;
at least one host fabric; and
network interface controller circuitry comprising:
network interface circuitry for use in Remote Direct Memory Access (RDMA) over Converged Ethernet (RoCE) packet data communication with the remote system via the at least one multi-switch fabric, the ROCE packet data communication to indicate at least one RDMA write to the host system from the remote system and/or at least one RDMA read from the host system to the remote system, the RoCE packet data communication to be initiated in response, at least in part, to at least one host application request; and
programmable circuitry to perform operations comprising:
in event that the ROCE packet data communication indicates the at least one RDMA write, directly writing, via the at least one host fabric, received packet data to the at least one GPU-accessible memory;
in event that the ROCE packet data communication indicates the at least one RDMA read, directly reading, via the at least one host fabric, other data from the at least one GPU-accessible memory that is to be provided to the remote system via the ROCE packet data communication; and
encryption, decryption, and compression-related host central processing unit (CPU) offload operations;
wherein:
the writing and the reading are to be performed in a manner that bypasses both (1) host CPU and/or host operating system (OS) in the writing and the reading, and (2) copying of the received packet data and the other data to the at least one host memory of the host system;
the writing and/or the reading are configurable to comprise use of direct data placement (DDP);
the writing and/or the reading are configurable to comprise use of address translation;
the address translation is to be implemented, at least in part, using the device driver;
portions of the received packet data and/or the other data are to be routed to their destinations via respective fabric-associated routings;
the respective fabric-associated routings are configurable to be mutually different from each other, at least in part; and
the at least one multi-switch fabric is to communicatively couple multiple switches associated with the host system and the remote system.

23. The host system of claim 22, wherein:
the at least one host fabric comprises Peripheral Component Interconnect Express (PCIe) interconnect; and
the network interface controller circuitry is to be comprised in a circuit board that is to be communicatively coupled to the PCIe interconnect.

24. The host system of claim 23, wherein:
the received packet data and/or the other data are for use in association with artificial intelligence and/or machine learning.

25. The host system of claim 24, wherein:
the host system and the remote system each comprise multiple respective graphics processing units;
the at least one GPU-accessible memory is accessible by the multiple respective graphics processing units of the host system; and
at least one other GPU-accessible memory of the remote system is accessible by the multiple respective graphics processing units of the remote system.

26. The host system of claim 22, wherein:
the programmable circuitry is also for use in association with memory isolation.

27. The host system of claim 22, wherein:
at least one application specific integrated circuit (ASIC) comprises the programmable circuitry; and
the at least one host fabric comprises at least one accelerator fabric.

28. A data center system comprising:
at least one multi-switch fabric;
a remote system; and
a host system to be communicatively coupled via the at least one multi-switch fabric to the remote system, the host system comprising:
at least one graphics processing unit (GPU)-accessible memory;
at least one host memory;
at lea one host fabric; and
network interface controller circuitry comprising:
network interface circuitry for use in Remote Direct Memory Access (RDMA) over Converged Ethernet (RoCE) packet data communication with the remote system via the at least one multi-switch fabric, the ROCE packet data communication to indicate at least one RDMA write to the host system from the remote system and/or at least one RDMA read from the host system to the remote system, the ROCE packet data communication to be initiated in response, at least in part, to at least one host application request; and
programmable circuitry to perform operations comprising:
in event that the ROCE packet data communication indicates the at least one RDMA write, directly writing, via the at least one host fabric, received packet data to the at least one GPU-accessible memory;

in event that the ROCE packet data communication indicates the at least one RDMA read, directly reading, via the at least one host fabric, other data from the at least one GPU-accessible memory that is to be provided to the remote system via the ROCE packet data communication; and encryption, decryption, and compression-related host central processing unit (CPU) offload operations;

wherein:

the writing and the reading are to be performed in a manner that bypasses both (1) host CPU and/or host operating system (OS) in the writing and the reading, and (2) copying of the received packet data and the other data to the at least one host memory of the host system;

the writing and/or the reading are configurable to comprise use of direct data placement (DDP);

the writing and/or the reading are configurable to comprise use of address translation;

the address translation is to be implemented, at least in part, using the device driver;

portions of the received packet data and/or the other data are to be routed to their destinations via respective fabric-associated routings;

the respective fabric-associated routings are configurable to be mutually different from each other, at least in part; and the at least one multi-switch fabric is to communicatively couple multiple switches associated with the host system and the remote system.

29. The data center system of claim 28, wherein:
the at least one host fabric comprises Peripheral Component Interconnect Express (PCIe) interconnect; and
the network interface controller circuitry is to be comprised in a circuit board that is to be communicatively coupled to the PCIe interconnect.

30. The data center system of claim 29, wherein:
the received packet data and/or the other data are for use in association with artificial intelligence and/or machine learning.

31. The data center system of claim 30, wherein:
the host system and the remote system each comprise multiple respective graphics processing units;
the at least one GPU-accessible memory is accessible by the multiple respective graphics processing units of the host system; and
at least one other GPU-accessible memory of the remote system is accessible by the multiple respective graphics processing units of the remote system.

32. The data center system of claim 28, wherein:
the programmable circuitry is also for use in association with memory isolation.

33. The data center system of claim 28, wherein:
at least one application specific integrated circuit (ASIC) comprises the programmable circuitry; and
the at least one host fabric comprises at least one accelerator fabric.

* * * * *